US011521646B2

(12) United States Patent
Miyamoto et al.

(10) Patent No.: US 11,521,646 B2
(45) **Date of Patent: *Dec. 6, 2022**

(54) HARD DISK DRIVE HAVING DUAL MICRO-ACTUATORS ON CARRIAGE ARMS

(71) Applicants: Kabushiki Kaisha Toshiba, Tokyo (JP); Toshiba Electronic Devices & Storage Corporation, Tokyo (JP)

(72) Inventors: Koichiro Miyamoto, Yokohama Kanagawa (JP); Kenichiro Oozeki, Yokohama Kanagawa (JP); Yu Chen, Sagamihara Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/224,725

(22) Filed: Apr. 7, 2021

(65) Prior Publication Data

US 2021/0256997 A1 Aug. 19, 2021

Related U.S. Application Data

(63) Continuation of application No. 16/797,321, filed on Feb. 21, 2020, now Pat. No. 10,984,827.

(30) Foreign Application Priority Data

Jul. 10, 2019 (JP) ............................ JP2019-128553

(51) Int. Cl.
*G11B 5/55* (2006.01)
*G11B 25/04* (2006.01)
(Continued)

(52) U.S. Cl.
CPC ........... *G11B 5/5573* (2013.01); *G11B 5/012* (2013.01); *G11B 5/59633* (2013.01);
(Continued)

(58) Field of Classification Search
None
See application file for complete search history.

(56) References Cited

U.S. PATENT DOCUMENTS 5,574,881 A 11/1996 Yasuoka et al.
6,078,476 A 6/2000 Magee et al.
(Continued)

FOREIGN PATENT DOCUMENTS

CN 106887242 A 6/2017
JP H06-60576 A 3/1994
JP 2003-257138 A 9/2003

*Primary Examiner* — William J Klimowicz
(74) *Attorney, Agent, or Firm* — Allen & Overy LLP

(57) ABSTRACT

According to one embodiment, there is provided a hard disk drive including a first recording surface, a second recording surface, a first magnetic head, a first actuator and a second actuator that move the first magnetic head, a second magnetic head, a third actuator and a fourth actuator that move the second magnetic head, a fifth actuator that moves the second actuator and the fourth actuator, a drive circuit that implements at least one of a first mode in which the second actuator and the fourth actuator operate differently from each other or a second mode in which the first and third actuators operate differently from each other, and a controller that controls the drive circuit.

14 Claims, 20 Drawing Sheets

224
Carriage Arm 226A
229A 223A 212A 227A 329A 225A 323A 221A
Magnetic Disk 210A
221B 323B 227B 329B 212B 223B 225B
229C 229B Carriage Arm 226B
223C 212C 227C 329C 225C 323C 221C
Magnetic Disk 210B
221D 323D 227D 329D 212D 223D 225D
229E 229D Carriage Arm 226C
223E 212E 227E 329E 225E 323E 221E
Magnetic Disk 210C
221F 323F 227F 329F 212F 223F 225F
229F Carriage Arm 226D

(51) Int. Cl.
*G11B 5/596* (2006.01)
*G11B 5/012* (2006.01)
*G11B 5/58* (2006.01)
*G11B 5/56* (2006.01)

(52) U.S. Cl.
CPC .......... *G11B 25/046* (2013.01); *G11B 5/5578* (2013.01); *G11B 5/56* (2013.01); *G11B 5/58* (2013.01)

(56) References Cited

U.S. PATENT DOCUMENTS

| | | | | |
|---|---|---|---|---|
| 6,542,326 | B1 | 4/2003 | Ell et al. | |
| 7,027,253 | B1 | 4/2006 | Sun et al. | |
| 7,218,471 | B2 | 5/2007 | Meyer | |
| 7,804,661 | B2 * | 9/2010 | Wilcox | G11B 5/5552 360/75 |
| 9,824,707 | B2 | 11/2017 | Kawabe et al. | |
| 9,911,442 | B1 * | 3/2018 | Kharisov | G11B 5/5552 |
| 10,037,779 | B1 | 7/2018 | Mendonsa et al. | |
| 10,043,543 | B1 | 8/2018 | Buch et al. | |
| 10,431,246 | B2 | 10/2019 | Zhu et al. | |
| 10,431,257 | B1 * | 10/2019 | Ehrlich | G11B 5/4873 |
| 10,547,264 | B1 | 1/2020 | Buch | |
| 10,566,017 | B2 | 2/2020 | Yoshikawa | |
| 10,614,852 | B2 * | 4/2020 | Dunn | G06F 3/061 |
| 10,665,257 | B2 * | 5/2020 | Schmidt | G11B 5/59627 |
| 10,741,210 | B1 | 8/2020 | Hillukka et al. | |
| 10,770,110 | B1 * | 9/2020 | Ehrlich | G11B 5/59688 |
| 10,770,111 | B1 * | 9/2020 | Zayas | G11B 21/106 |
| 10,984,827 | B2 * | 4/2021 | Miyamoto | G11B 5/5552 |
| 11,036,436 | B2 * | 6/2021 | Calfee | G06F 3/0676 |
| 2007/0263317 | A1 * | 11/2007 | Kwon | G11B 5/5552 360/78.12 |
| 2017/0169844 | A1 | 6/2017 | Kawabe et al. | |
| 2021/0096764 | A1 * | 4/2021 | Calfee | G06F 3/0655 |
| 2021/0141566 | A1 * | 5/2021 | Sudo | G06F 3/0653 |

* cited by examiner

HARD DISK DRIVE HAVING DUAL MICRO-ACTUATORS ON CARRIAGE ARMS

CROSS-REFERENCE TO RELATED APPLICATIONS

This application is a continuation of application Ser. No. 16/797,321 filed on Feb. 21, 2020 and is based upon and claims the benefit of priority from Japanese Patent Application No. 2019-128553, filed Jul. 10, 2019, the entire contents of which are incorporated herein by reference.

FIELD

Embodiments of the present invention relate to a hard disk drive.

BACKGROUND

In general, a hard disk drive (hereinafter referred to as HDD) incorporates a servo system for performing control to position a magnetic head at a target position for reading/writing data on a magnetic disk as a recording medium.

The servo system uses servo information pre-recorded on the magnetic disk to perform control for positioning the magnetic head.

Examples of a method of recording servo information on a magnetic disk include self-servo write (SSW) that uses an actuator and a magnetic head built in the HDD.

DETAILED DESCRIPTION

According to one embodiment, there is provided a hard disk drive including a first recording surface, a second recording surface, a first magnetic head, a first actuator and a second actuator that move the first magnetic head, a second magnetic head, a third actuator and a fourth actuator that move the second magnetic head, a fifth actuator that moves the second actuator and the fourth actuator, a drive circuit that implements at least one of a first mode in which the second actuator and the fourth actuator operate differently from each other or a second mode in which the first and third actuators operate differently from each other, and a controller that controls the drive circuit.

Embodiments of the present invention will be described with reference to the accompanying drawings.

First Embodiment

Figure 1:
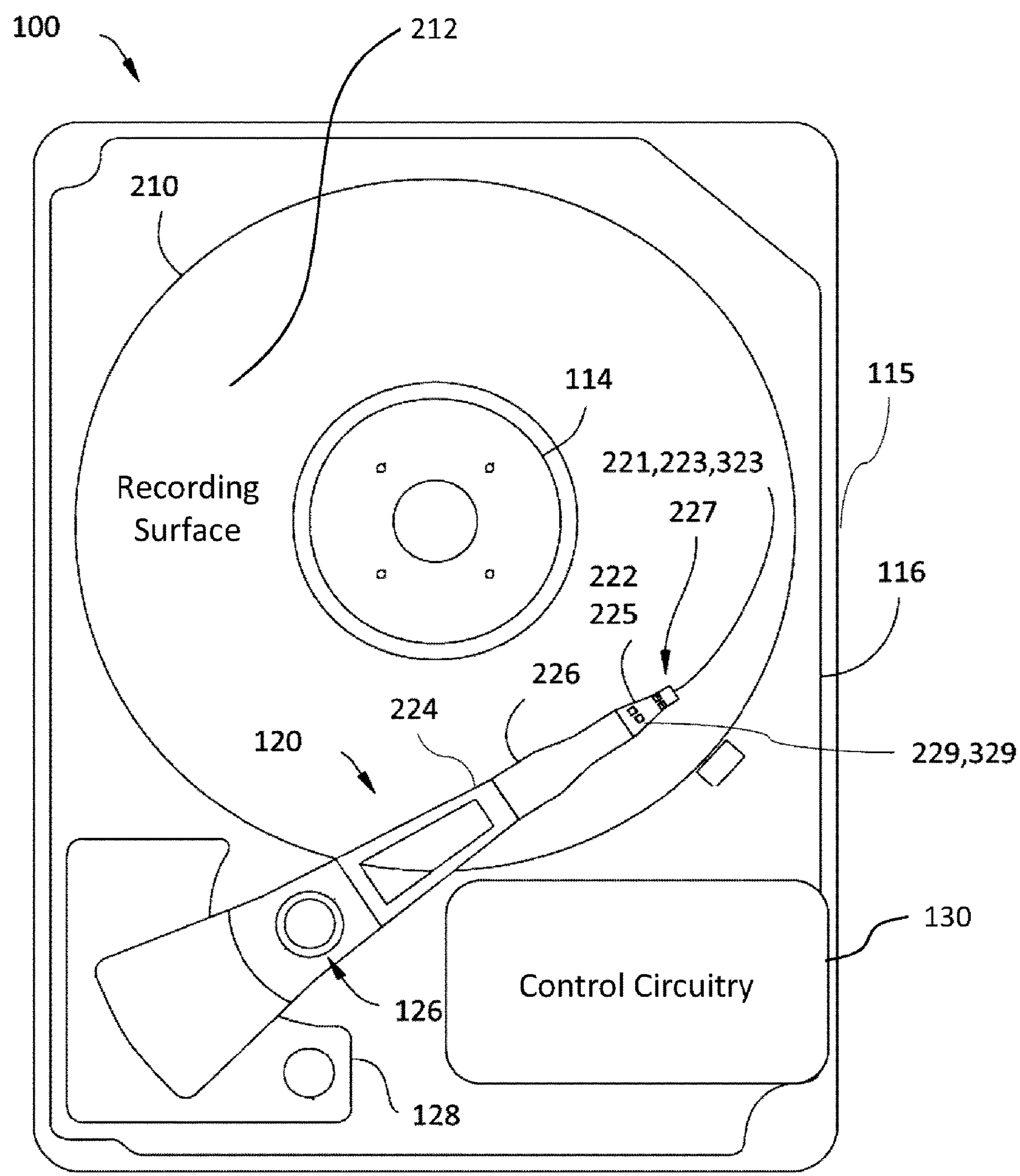
FIG. 1 is a schematic view illustrating an exemplary configuration of an HDD according to an embodiment.
Figure 2:
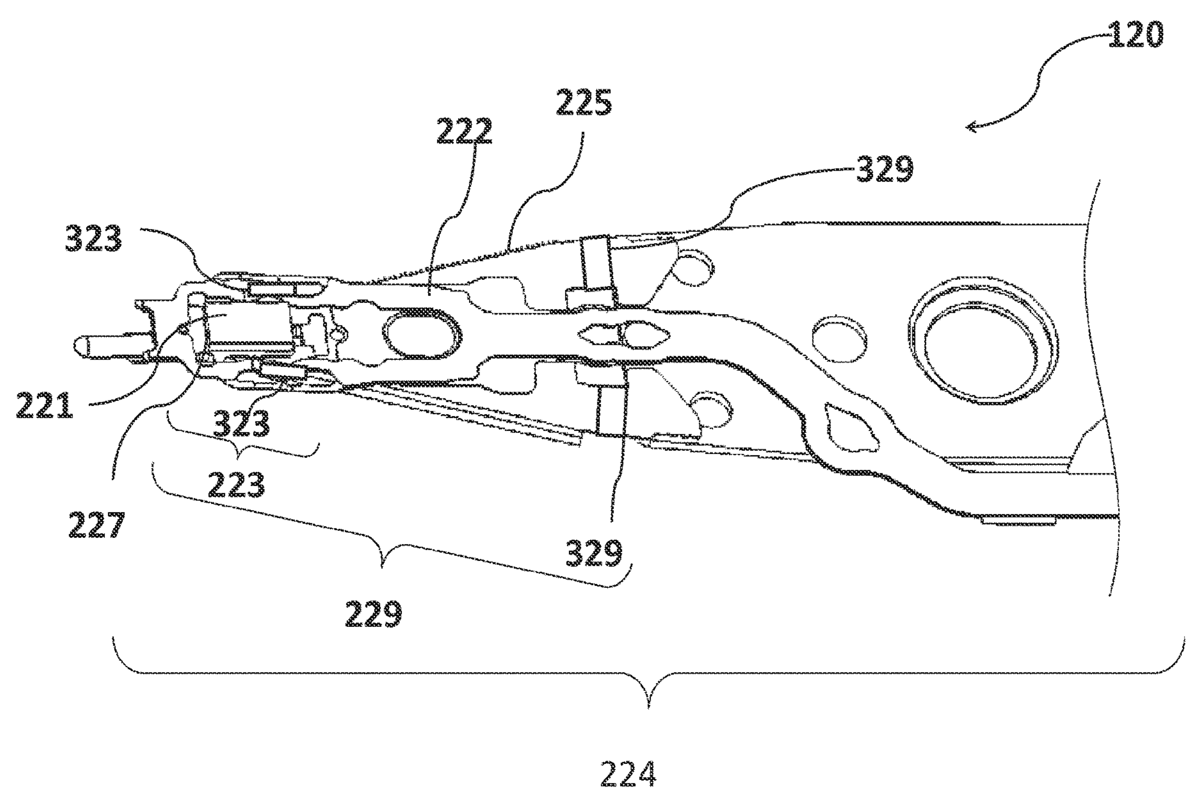
FIG. 2 is a perspective view illustrating an exemplary configuration of a distal end of an arm according to the embodiment.

First, an exemplary configuration of an HDD 100 according to a first embodiment will be described with reference to FIGS. 1 and 2. FIG. 1 is a schematic view illustrating the HDD 100 according to the first embodiment, which illustrates an internal structure with a top cover being removed. FIG. 2 is a perspective view illustrating an exemplary configuration of a distal end of an arm 120 according to the embodiment.

The HDD 100 includes a housing 115. The housing 115 includes a rectangular box-shaped base 116 with an upper surface being opened, and a top cover (not illustrated) for covering the opening of the base 116. The base 116 has a rectangular bottom wall, and side walls erected along the periphery of the bottom wall.

A spindle motor (hereinafter referred to as SPM) 114 is attached to the base 116. The HDD 100 includes a plurality of magnetic disks 210. The magnetic disks 210 are attached to be stacked in multiple stages at predetermined intervals along the rotation axis of the SPM 114, and rotate in an integrated manner. In the present specification, the "integrated manner" indicates that multiple elements move together as one. Note that the HDD 100 includes only one magnetic disk 210.

A VCM actuator 224 includes a voice coil motor (VCM) 128, and the entire arm 120. The VCM actuator 224 drives, using the VCM 128, the arm 120 to rotate about a support shaft 126, and moves a magnetic head 227 coupled to the distal end of the arm 120. The VCM 128 is attached to the base 116. In the longitudinal direction of the arm 120, the side of the VCM 128 is the base end side, and the side of the magnetic head 227 is the distal end side.

In the present specification, the arm 120 is described as a structure including a carriage arm 226, a load beam 225, and a flexure 222.

A plurality of the arms 120 is arranged side by side in the direction along the support shaft 126. The carriage arm 226 of the arm 120 is attached to the support shaft 126. The arm 120 is attached to the base 116 via the support shaft 126.

The load beam 225 is provided at the distal end of the carriage arm 226. The load beam 225 is made of a thin metal plate or the like, and functions as a part of a suspension that presses a slider 221 against the magnetic disk 210 The flexure 222 is provided on the load beam 225. The flexure 222 has a flexible thin resin plate, and a conductor pattern for wiring of the magnetic head 227. The slider 221 is provided on the flexure 222. The magnetic head 227 is provided on the slider 221. The magnetic head 227 reads/writes data from/to the magnetic disk 210.

The flexure 222 is provided with a driver 323. The driver 323 drives a first microactuator (hereinafter referred to as first MA) 223. The first MA 223 includes the driver 323, and has a distal end side from a position where the driver 323 of the flexure 222 is mounted. The first MA 223 drives, using the driver 323, the distal end side of the flexure 222 from the position where the driver 323 is mounted, and moves the magnetic head 227 mounted on the distal end of the arm 120.

The load beam 225 of the arm 120 is provided with a driver 329. The driver 329 drives a second microactuator (hereinafter referred to as second MA) 229. The second MA 229 includes the driver 329, and has a distal end side from a position where the driver 329 of the load beam 225 is mounted. The second MA 229 drives, using the driver 329, the distal end side of the load beam 225 from the position where the driver 329 is mounted. Therefore, the second MA 229 moves the magnetic head 227 and the first MA 223 in an integrated manner.

The first MA 223 and the second MA 229 can be provided on the load beam 225 or on the flexure 222. Although the first MA 223 is disposed at a position close to the base end of the slider 221 on the flexure 222 in FIG. 2, it may be disposed at a position close to the distal end of the slider 221 on the load beam 225. Hereinafter, descriptions will be given with the flexure 222 being omitted in the drawings regardless of whether each MA is provided on the load beam 225 or on the flexure 222.

Piezoelectric elements including a pair of piezoelectric elements can be used as the drivers 329 and 323. As the piezoelectric element, for example, a rectangular tabular piezoelectric element of a thin film type is used. Note that, not only a thin film type, but also a bulk type or a stacked bulk type piezoelectric element may be used.

The driver 323 is electrically connected to a bus 343 to be described later. With a voltage being applied to the driver 323 via the bus 343, the driver 323 expands and contracts in the longitudinal direction of the arm 120. The first MA 223 operates as the driver 323 expands and contracts, and can displace the magnetic head 227 in the radial direction of the magnetic disk 210.

The driver 329 is electrically connected to buses 344 and 345 to be described later. With a voltage being applied to the driver 329 via the buses 344 and 345, the driver 329 expands and contracts along its longitudinal direction. The second MA 229 operates as the load beam 225 deforms by the driver 329 being expanded and contracted, and can displace the magnetic head 227 in the radial direction of the magnetic disk 210.

The drivers 323 and 329 are not limited to piezoelectric elements, and other drivers that operate by electric signals may be used.

The VCM actuator 224, the first MA 223, and the second MA 229 can drive the side closer to the distal end of the arm 120 in that order, and can control the position of the magnetic head 227 more finely.

Control circuitry 130 controls operation of the HDD 100.

Figure 3:
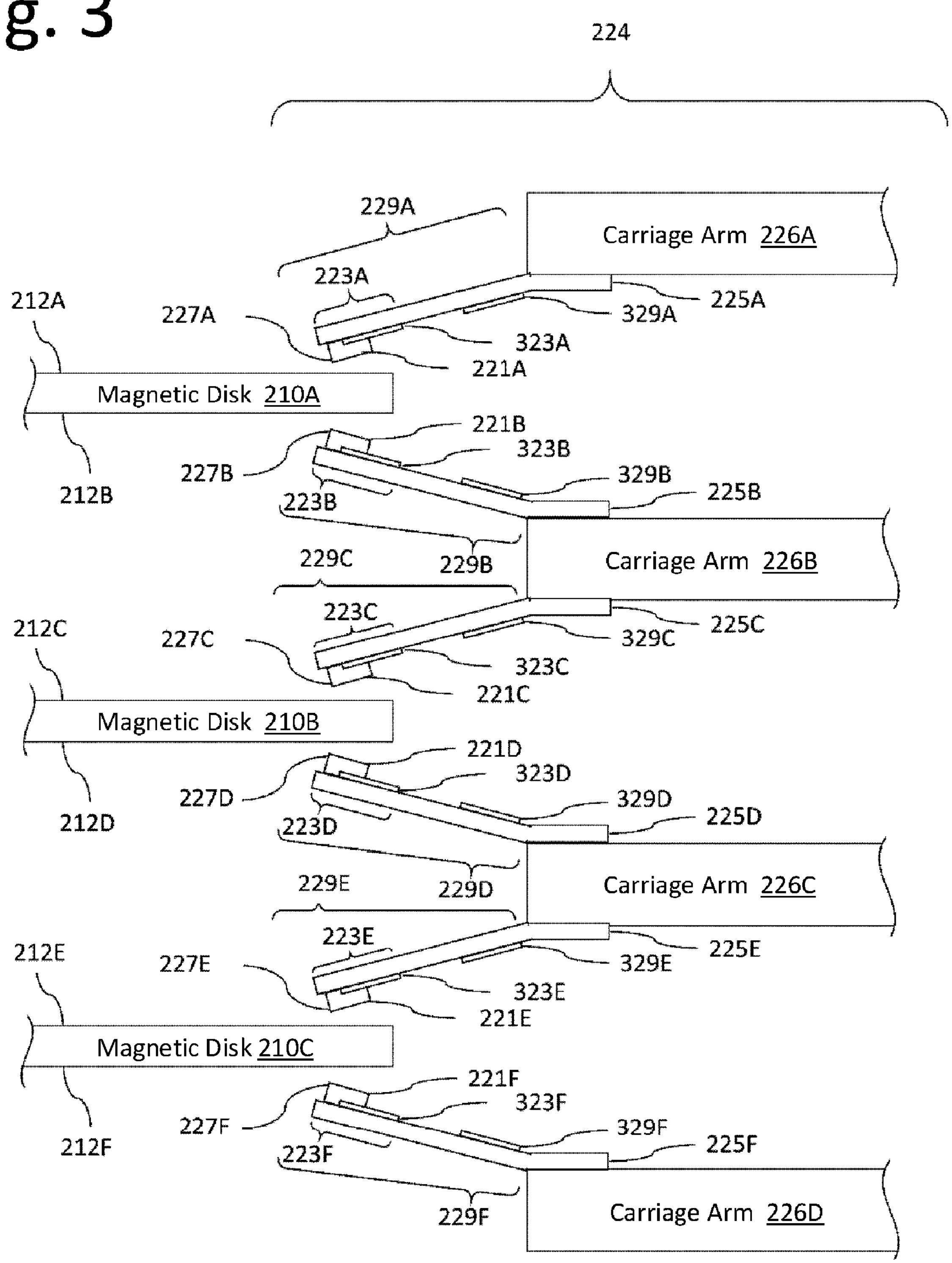
FIG. 3 is a side view illustrating an exemplary configuration of the HDD according the embodiment.

As illustrated in FIG. 3, the HDD 100 includes a plurality of magnetic disks 210 each having two recording surfaces 212. In the embodiment illustrated in FIG. 3, the HDD 100 includes a magnetic disk 210A having recording surfaces 212A and 212B, a magnetic disk 210B having recording surfaces 212C and 212D, and a magnetic disk 210C having recording surfaces 212E and 212F. The number of magnetic disks 210 included in the HDD 100 is not limited to three, and may be two or less, or four or more. Each of the magnetic disks 210 may have one recording surface 212.

The HDD 100 has magnetic heads 227A to 227F, and the recording surfaces 212A to 212F. The magnetic heads 227A to 227F read/write data on the recording surfaces 212A to 212F, respectively.

The magnetic heads 227A to 227F are attached to sliders 221A to 221F, respectively. The sliders 221A to 221F are attached to load beams 225A to 225F, respectively. The load beam 225A is coupled to a carriage arm 226A. The load beams 225B and 225C are coupled to a carriage arm 226B. The load beams 225D and 225E are coupled to a carriage arm 226C. The load beam 225F is coupled to a carriage arm 226D.

Second MAs 229A to 229F are provided on the load beams 225A to 225F, respectively. First MAs 223A to 223F are provided between the magnetic heads 227A to 227F and the second MAs 229A to 229F, respectively, of the load beams 225A to 225F and flexures 222A to 222F, respectively.

The second MAs 229A to 229F move the first MAs 223A to 223F and the magnetic heads 227A to 227F, respectively, in an integrated manner. The VCM actuator 224 moves the second MAs 229A to 229F in an integrated manner via the load beam 225 and the carriage arm 226. Furthermore, the VCM actuator 224 moves the second MAs 229A to 229F to move the first MAs 223A to 223F and the magnetic heads 227A to 227F, which are integrally moved by the second MAs 229A to 229F, integrally with the second MAs 229A to 229F.

The first MA 223 and the second MA 229 adjust deviation of the magnetic head 227 from the target position on the recording surface 212 of the magnetic disk 210. The first MA 223 and the second MA 229 move the magnetic head 227 in the radial direction of the magnetic disk 210 to correct the positional deviation with respect to a target track 420 so that the magnetic head 227 can perform reading/writing on the track 420 at an appropriate position.

Figure 4:
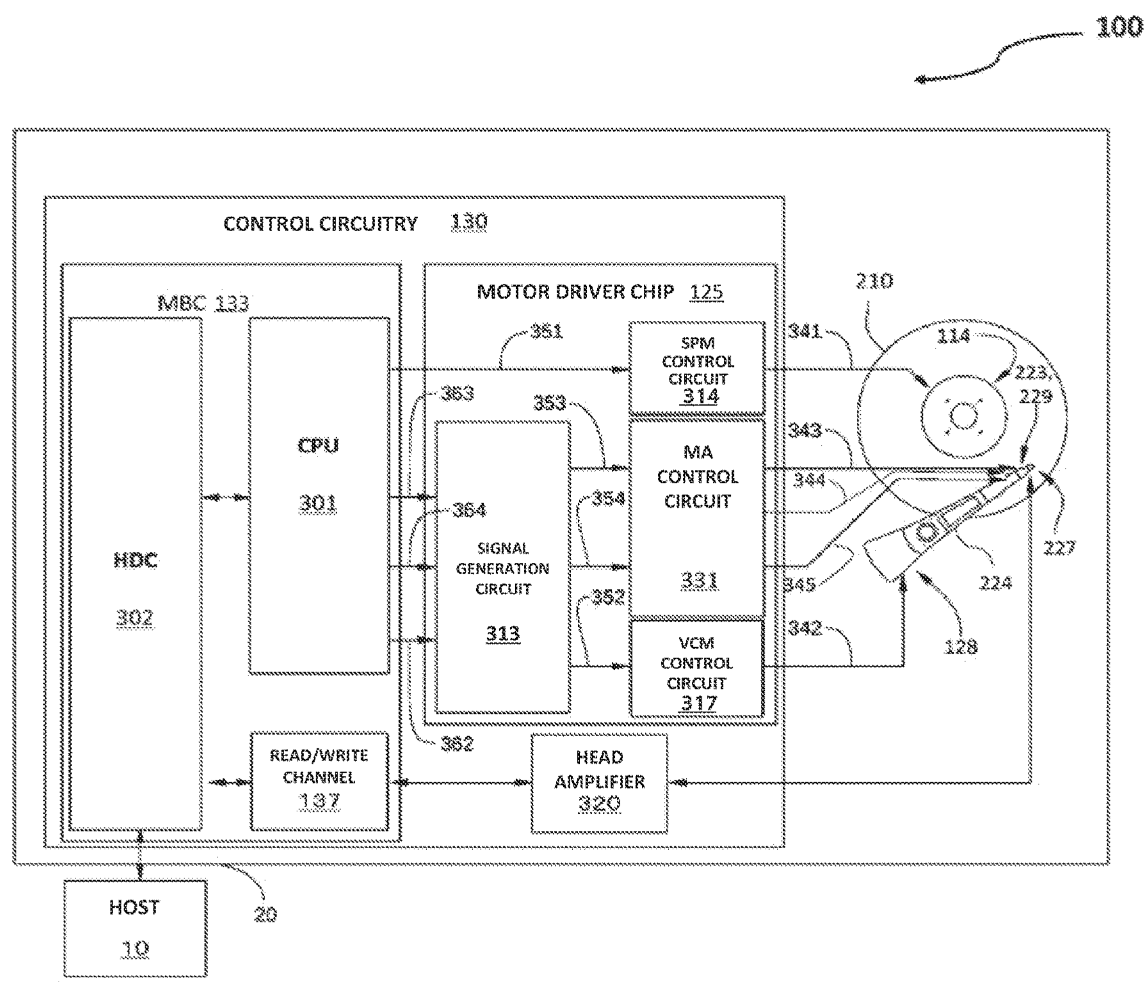
FIG. 4 is a block diagram schematically illustrating a function of each part of the HDD according to the embodiment.

Next, a function of each part of the HDD 100 will be described with reference to FIG. 4. FIG. 4 is a block diagram illustrating the function of each part of the HDD 100 according to the embodiment.

The control circuitry 130 of the HDD 100 includes a microprocessor-based controller (hereinafter referred to as MBC) 133, a motor driver chip 125, and a head amplifier 320.

The MBC 133 processes signals for operating the HDD 100 and signals obtained by the operation of the HDD 100, and transmits the signals to each part of the HDD 100 or a host system 10. The MBC 133 includes a central processing unit (CPU) 301, a hard disk controller (hereinafter referred to as HDC) 302, and a read/write channel (R/W channel) 137.

The motor driver chip 125 controls the SPM 114, the first MA 223, the second MA 229, and the VCM 128 to control rotation of the magnetic disk 210 and a position of the magnetic head 227. The motor driver chip 125 includes a signal generation circuit 313, a spindle motor control circuit (SPM control circuit) 314, a voice coil motor control circuit (VCM control circuit) 317, and a microactuator control circuit (MA control circuit) 331.

The HDD 100 is connected to the host system 10, such as a host computer, via an interface 20. Examples of the standard of the interface 20 include serial advanced technology attachment (SATA) and serial attached SCSI (SAS).

The HDC 302 is a controller for controlling operation of the HDD 100 in accordance with commands from the host system 10. The HDC 302 communicates with the host system 10 via the interface 20, and controls transfer of read/write data between the HDD 100 and the host system 10.

The read/write channel 137 is a signal processing circuit, which encodes write data transferred from the HDC 302, converts the data into write signals, and outputs the write signals to the head amplifier 320. Furthermore, the read/write channel 137 decodes read signals output from the magnetic head 227, converts the signals into read data, and outputs the read data to the HDC 302.

The head amplifier 320 amplifies the write signals output from the read/write channel 137, and transmits the signals to the magnetic head 227. Furthermore, the head amplifier 320 amplifies the read signals output from the magnetic head 227, and transmits the signals to the read/write channel 137. Note that the head amplifier 320 is typically provided on the arm 120.

The CPU 301 analyzes the command received by the HDC 302 from the host system 10, and monitors a device status of the magnetic disk 210. The CPU 301 determines a speed and a displacement amount of the SPM 114, the first MA 223, the second MA 229, and the VCM 128.

The SPM control circuit 314 controls rotation of the SPM 114 under control of the CPU 301. The SPM control circuit 314 receives signals from the CPU 301 via wiring 351, and outputs the signals to the SPM 114 via wiring 341.

The signal generation circuit 313 generates digital signals for controlling the first MA 223 and the second MA 229, and transmits the signals to the MA control circuit 331 through signal lines 353 and 354. The signal generation circuit 313 generates digital signals for controlling the VCM 128, and transmits the signals to the VCM control circuit 317 through wiring 352.

The buses 343, 344, and 345 transmit signals in the direction of the arrows between the elements connected by lines.

The VCM control circuit 317 generates, on the basis of the digital signals transmitted from the signal generation circuit 313, a drive voltage appropriate for operation of the VCM 128, and applies it to the VCM 128. The VCM 128 to which the drive voltage is applied moves the magnetic head 227 to the target track 420.

The MA control circuit 331 is capable of switching an operation mode (hereinafter simply referred to as operation) of the HDD 100 to dual-stage actuator (DSA) operation or to triple-stage actuator (TSA) operation. Note that, in the following descriptions of the present embodiment, parallel micro-actuator (PMA) operation will be exemplified when the HDD 100 performs the DSA operation.

Figure 5:
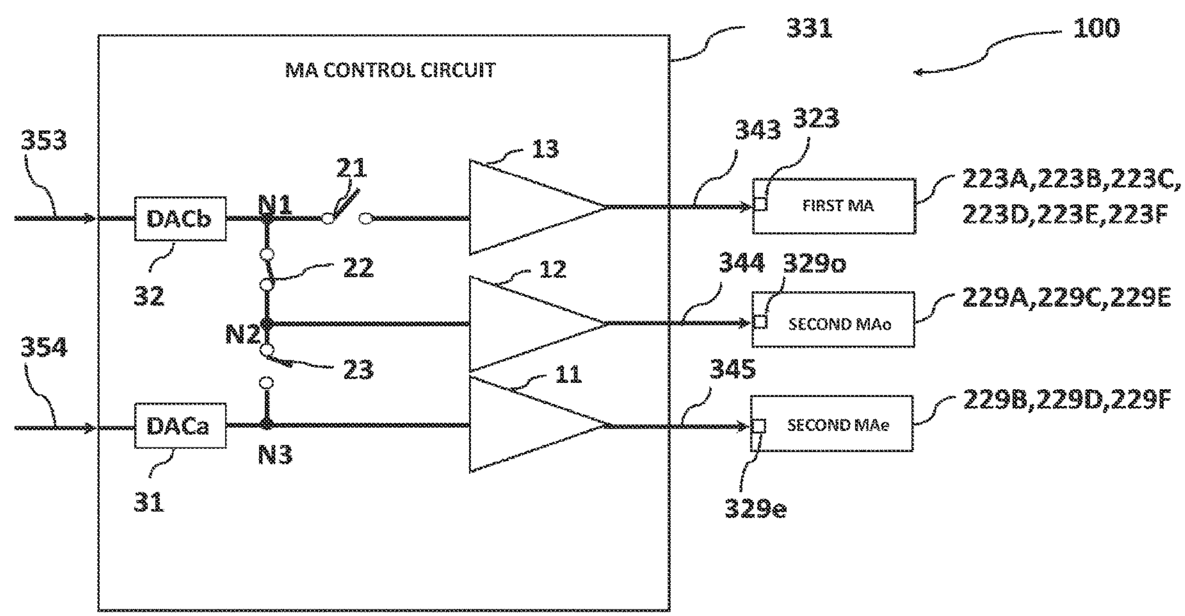
FIG. 5 is a block diagram schematically illustrating an MA control circuit during DSA operation according to a first embodiment.
Figure 6:
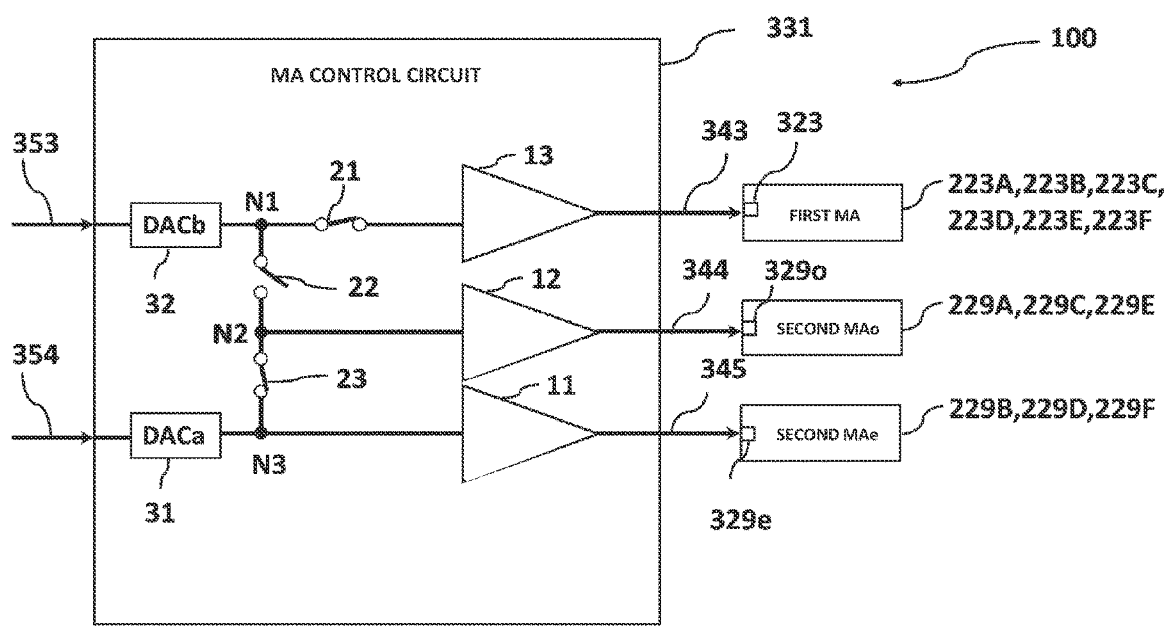
FIG. 6 is a block diagram schematically illustrating the MA control circuit during TSA operation according to the first embodiment.

Next, an exemplary configuration of the MA control circuit 331 according to the first embodiment will be described with reference to FIGS. 3, 5, and 6. FIG. 5 is a block diagram schematically illustrating the MA control circuit 331 during the DSA operation according to the first embodiment. FIG. 6 is a block diagram schematically illustrating the MA control circuit 331 during the TSA operation according to the first embodiment. In the present embodiment, the MA control circuit 331 is capable of switching operation of the HDD 100 to dual-stage actuator (DSA) operation or to triple-stage actuator (TSA) operation.

Here, the DSA is a device in which a single-stage MA is provided in addition to the VCM actuator 224, which is a device for moving the magnetic head 227. The DSA can control the position of the magnetic head 227 by the dual-stage actuators operating in cooperation. Note that, in the present embodiment, the HDD 100 is provided with a dual-stage MA as illustrated in FIG. 2. Therefore, when the HDD 100 performs the DSA operation, control is performed in such a manner that one of the first MA 223 and the second MA 229 is secured.

Note that, in the present specification, a “stage” refers to a set of actuators in which the range of the arm 120 for moving the magnetic head 227 is the same. Even in the case of a plurality of actuators at the same stage operates differently if different signals are input. In the case of being described as “N stages”, it indicates that there are N actuators each having a different operation range of the arm 120 and moving one magnetic head 227.

The PMA is a technique in which a plurality of MAs at the same stage is independently operated and fine positioning control is performed on a plurality of magnetic heads 227 on a plurality of recording surfaces 212 simultaneously. According to the PMA operation, the magnetic heads 227 whose positions are independently controlled can simultaneously perform reading/writing on the different recording surfaces 212. Note that, in the following descriptions of the present embodiment, the PMA operation will be exemplified when the HDD 100 performs the DSA operation.

Note that, in the present specification, “independent” indicates that, in two magnetic heads 227 or two first MA 223 and second MA 229, a displacement amount or operation of one of them is not interfered with a status of the other one.

Here, the TSA is a device in which the first MA 223 and the second MA 229 are provided in addition to the VCM actuator 224, which is a device for moving the magnetic head 227. The TSA can accurately control the position of the magnetic head 227 by the actuators of triple stages in total operating in cooperation.

Hereinafter, in FIG. 3, recording surfaces (212A, 212C, and 212E) that appear in odd numbers when being counted from the side of the recording surface 212A and are oriented in the same direction as the recording surface 212A will be referred to as recording surfaces 212*o*. Similarly, recording surfaces (212B, 212D, and 212F) that appear in even numbers when being counted from the side of the recording surface 212A and are oriented in the same side as 212B will be referred to as recording surfaces 212*e*. In other words, in the present specification, it is distinguished whether the recording surface 212 is odd-numbered or even-numbered when being numbered from a certain direction by adding “o” or “e”. In the present specification, a configuration corresponding to the recording surface 212*o* may be indicated with “o” added to its name, and a configuration corresponding to the recording surface 212*e* may be indicated with "e" added to its name. Notation without "o" or "e" or represents the entire configurations or any of the configurations.

For example, the odd-numbered magnetic heads 227, sliders 221, second MAs 229, first MAs 223, and load beams 225 may be collectively referred to as a magnetic head 227*o*, slider 221*o*, second MA 229*o*, first MA 223*o*, and 225*o*, respectively. The even-numbered ones will be treated in a similar manner, and for example, the magnetic heads 227B, 227D, and 227F may be referred to as a magnetic head 227*e*.

As illustrated in FIGS. 5 and 6, the MA control circuit 331 according to the first embodiment includes a digital/analog converter a (hereinafter referred to as DACa) 31, a digital/analog converter b (hereinafter referred to as DACb) 32, a single-pole switch 21, a single-pole switch 22, a single-pole switch 23, a second amplifier e11, a second amplifier o12, and a first amplifier 13.

The boxes indicated as the first MA in FIGS. 5 and 6 collectively represent the first MAs 223A, 223B, 223C, 223D, 223E, and 223F. The box indicated as the second MAo collectively represents the second MA 229*o*, that is, the second MAs 229A, 229C, and 229E. The box indicated as the second MAe collectively represents the second MA 229*e*, that is, the second MAs 229B, 229D, and 229F. Signals input to those boxes are input to all MAs collectively represented in the boxes.

The MA control circuit 331 applies a voltage suitable for operation to each MA on the basis of the digital signals transmitted from the signal generation circuit 313, and moves the magnetic head 227, which has been roughly moved to the target position (target track) by the VCM 128, to a more accurate position.

The DACa 31 and the DACb 32 are digital/analog converters, and convert digital signals for operating the first MA 223 and the second MA 229 instructed by the CPU 301 into analog signals. Digital signals for controlling the first MA 223 and the second MA 229 generated by the signal generation circuit 313 are input to the DACa 31 via the signal line 353 and to the DACb 32 via the signal line 354.

The second amplifier e11, the second amplifier o12, and the first amplifier 13 amplify the analog signals output from the DACa 31 and the DACb 32, and output the amplified signals to the second MA 229 and the first MA 223, thereby operating the first MA 223 and the second MA 229.

One end of the single-pole switch 21 is electrically connected to the output terminal of the DACb 32 at a node N1, and the other end is electrically connected to the input terminal of the first amplifier 13.

Furthermore, one end of the single-pole switch 22 is electrically connected to one end of the single-pole switch 21 at the node N1, and the other end of the single-pole switch 22 is electrically connected to the input terminal of the second amplifier o12 at a node N2.

Furthermore, the other end of the single-pole switch 22 is electrically connected to one end of the single-pole switch 23 at the node N2, and the other end of the single-pole switch is electrically connected to the input terminal of the second amplifier e11 and to the output terminal of the DACa 31 at a node N3.

Note that, in the present specification, the single-pole switch indicates a single-pole single-throw switch capable of operating one circuit by one operation and turning on/off one line.

The single-pole switch 21 controls on/off between the node N1 and the first amplifier 13. The single-pole switch 22 controls on/off between the node N1 and the node N2. The single-pole switch 23 controls on/off between the node N2 and the node N3.

The output terminal of the first amplifier 13 is electrically connected to the bus 343. One end of a driver 323*o* of the first MA 223*o* (223A, 223C, and 223E) is electrically connected to the bus 343, and the other end is connected to a ground potential. Here, the ground potential may be replaced with a node maintained at a predetermined potential, and the ground potential to be described in the present specification will be treated in a similar manner. One end of a driver 323*e* of the first MA 223*e* (223B, 223D, and 223F) is electrically connected to the bus 343, and the other end is connected to the ground potential. In the present embodiment, all drivers 323 are controlled in a similar manner regardless of the state of each single-pole switch.

That is, when the single-pole switch 21 is on, the same voltage is applied to all the drivers 323 through the bus 343, and when the single-pole switch 21 is off, no voltage is applied to all the drivers 323. At this time, the first MA 223*o* and the first MA 223*e* are controlled to be displaced by the same amount in the same direction with respect to the magnetic disk 210. Note that, when the single-pole switch 21 is off, 0 V is applied to all the drivers 323 through the bus 343. At this time, the first MA 223*o* and the first MA 223*e* do not operate. The first MA 223*o* and the first MA 223*e* perform the same operation at all times. The same operation includes operation in which multiple MAs are displaced by the same amount in the same direction, and operation in which multiple MAs are not displaced with no signal being input to the multiple MAs or with the same signals being continuously input to the multiple MAs. The displacement indicates that the position of the MA changes from the position of the MA when no signal is input or the position of the MA when predetermined signals are input.

The output terminal of the second amplifier o12 is electrically connected to the bus 344. One end of a driver 329*o* of the second MA 229*o* (229A, 229C, and 229E) is electrically connected to the bus 344, and the other end is connected to the ground potential.

The output terminal of the second amplifier e11 is electrically connected to the bus 345. One end of the second MA 229*e* (229B, 229D, and 229F) is electrically connected to the output terminal of the second amplifier e11, and the other end is connected to the ground potential.

The same voltage may be applied or different voltages may be applied to the driver 329*o* and the driver 329*e* depending on the status of the single-pole switches 21, 22, and 23. Therefore, the direction in which the second MA 229*o* and the second MA 229*e* are displaced and the amount of displacement may be the same or may be different.

There is no limitation on the method of controlling the on/off state of the single-pole switches 21, 22, and 23. However, the on/off state of the single-pole switches 21 to 23 may be controlled with a register status of the MA control circuit 331 (not illustrated in FIGS. 5 and 6) being changed under control of the CPU 301.

Next, the PMA operation according to the present embodiment will be described with reference to FIG. 5. During the PMA operation, the second MA 229*o* and the second MA 229*e* are separately controlled by the MA control circuit 331, and move the position of the magnetic head 227*o* and the position of the magnetic head 227*e* in a mutually independent manner. The combination of the recording surface 212*o* and the recording surface 212*e* to be simultaneously read/written may be, for example, a combination of the recording surfaces 212A and 212B, or a combination of the recording surfaces 212C and 212F.

The MAs positioned on the same stage are positioned to overlap in the stacking direction of a plurality of magnetic disks 210. In a case where two MAs positioned on the same stage independently operate, they operate differently, thereby positioning at different locations as viewed from the stacking direction of the magnetic disk 210. The different operations include an operation in which the displacement amount of one of the MAs is different from the displacement amount of the other MA, and an operation in which one of the MAs is displaced and the other MA is not displaced (secured at a predetermined position).

As illustrated in FIG. 5, during the PMA operation, the DACb 32 converts the digital signals input from the signal line 353 into analog signals. The DACa 31 converts the digital signals input from the signal line 354 into analog signals. The conduction states of the single-pole switches 21 to 23 of the MA control circuit 331 are that the single-pole switch 21 is off, the single-pole switch 22 is on, and the single-pole switch 23 is off.

The amplification factor of the second amplifier e11 is equal to the amplification factor of the second amplifier o12. The second amplifier o12 amplifies the analog signals output from the DACb 32. The second amplifier e11 amplifies the analog signals output from the DACa 31. The second MA 229*o* receives the signals amplified by the second amplifier o12, and moves the magnetic head 227*o*. The second MA 229*e* receives the signals amplified by the second amplifier e11, and moves the magnetic head 227*e*. Since the position of the magnetic head 227 is controlled by a total of two stages of actuators of the second MA 229 and the VCM actuator 224, the HDD 100 substantially operates as a DSA. Note that no signal is input to the first MA 223*o* and the first MA 223*e*, and no displacement occurs. In other words, the first MA 223*o* and the first MA 223*e* perform the same operation with no signal being input thereto.

In the PMA operation, a system that controls the position of the magnetic head 227 using the VCM 128 is assumed to be a VCM servo system, and a system that controls the position of the magnetic head 227 using the second MA 229 is assumed to be a second MA servo system.

The VCM servo system includes the CPU 301, the HDC 302, the read/write channel 137, the head amplifier 320, the VCM control circuit 317, and the VCM 128. The VCM servo system controls the position of the magnetic head 227. In controlling the position of the magnetic head 227, the CPU 301 determines current appropriate for the operation of the VCM 128. The appropriate current is determined on the basis of a signal for feeding back the position of the magnetic head 227, that is, a position error signal (PES). The PES is generated by the read/write channel 137 on the basis of servo information recorded in a servo area 400 read by the magnetic head 227, which is to be described later. The PES is generated by the read/write channel 137 in parallel with the position control of the magnetic head 227.

The second MA servo system precisely positions the magnetic head 227 with respect to the recording surface 212 corresponding to the magnetic head 227. The second MA servo system includes the CPU 301, the HDC 302, the read/write channel 137, the head amplifier 320, the MA control circuit 331, and the second MA 229. At the time of finely positioning the magnetic head 227, the CPU 301 determines a voltage appropriate for operating the second MA 229. The appropriate current for the VCM 128 and the appropriate voltage for the second MA 229 are determined on the basis of the PES of the magnetic head 227.

Next, the TSA operation will be described with reference to FIG. 6. During the TSA operation, both of the first MA 223 and the second MA 229 operate, and the magnetic head 227 corresponding to a certain recording surface 212 is moved to the target position. In the TSA operation, a single magnetic head 227 is positioned more precisely than that in the PMA operation (DSA operation) using three servo systems of the VCM servo system, the first MA servo system, and the second MA servo system.

As illustrated in FIG. 6, during the TSA operation, the DACb 32 converts the digital signals input from the signal line 353 into analog signals. The DACa 31 converts the digital signals input from the signal line 354 into analog signals. The conduction states of the single-pole switches 21 to 23 of the MA control circuit 331 are that the single-pole switch 21 is on, the single-pole switch 22 is off, and the single-pole switch 23 is on.

The first amplifier 13 amplifies the analog signals output from the DACb 32. The second amplifier e11 and the second amplifier o12 amplify the same analog signals output from the DACa 31. The first MA 223*o* and the first MA 223*e* receive the signals amplified by the first amplifier 13, and move the magnetic head 227*o* and the magnetic head 227*e* by the same amount in the same direction. In other words, the first MA 223*o* and the first MA 223*e* perform the same operation with the same signals being input thereto. The second MA 229*e* and the second MA 229*o* receive the same signals amplified by the second amplifier e11 and the second amplifier o12, and move the magnetic head 227*o* and the magnetic head 227*e* by the same amount in the same direction. In other words, the second MA 229*e* and the second MA 229*o* perform the same operation with the same signals being input thereto.

In the TSA operation, a system that controls the position of the magnetic head 227 using the VCM 128 is assumed to be a VCM 128 servo system, a system that controls the position of the magnetic head 227 using the first MA 223 is assumed to be a first MA servo system, and a system that controls the position of the magnetic head 227 using the second MA 229 is assumed to be a second MA servo system.

The VCM servo system during the TSA operation is the same as that during the PMA operation. The second MA servo system during the TSA operation is different from that during the PMA operation in that the second MA 229*o* and the second MA 229*e* perform the same operation without being displaced independently.

The first MA servo system precisely positions the magnetic head 227 with respect to the recording surface 212 corresponding to the magnetic head 227. The first MA servo system includes the CPU 301, the read/write channel 137, the head amplifier 320, the MA control circuit 331, and the first MA 223. At the time of finely positioning the magnetic head 227, the CPU 301 determines a voltage appropriate for operating the first MA 223. The appropriate current flowing through the VCM 128 and the appropriate voltage for the first MA 223 are determined on the basis of position feedback signals of the magnetic head 227, that is, the PES.

The usage of the PMA operation and the TSA operation by the HDD 100 will be described. By switching to the PMA operation, the HDD 100 can simultaneously perform reading/writing on a plurality of recording surfaces 212 using the DSA, thereby reducing the time required for the reading/writing. In addition, by switching to the TSA operation, the HDD 100 can read/write data at an accurate position.

For example, the reading can be switched to the PMA operation, and the writing can be switched to the TSA operation. In general, in a case where a position at which data is read with respect to a certain track 420 is shifted, data on the adjacent track 420 is not erased, and the data can be read again. Meanwhile, in a case where a position at which data is written with respect to a certain track 420 is shifted, data on the adjacent track 420 may be overwritten and erased.

The HDD 100 performs switching to the TSA operation having higher positional controllability on one magnetic head 227 at the time of writing having higher possibility of being overwritten, whereby erasure of recorded data can be suppressed. In addition, the HDD 100 performs switching to the PMA operation having higher positional controllability on two magnetic heads 227 at the time of reading having no possibility of being overwritten, whereby data can be quickly read by the plurality of magnetic heads 227.

Furthermore, the HDD 100 according to the present embodiment can selectively use the PMA operation and the TSA operation depending on whether the operation is SSW or normal reading/writing. When the HDD 100 uses the PMA operation for SSW, servo writing can be performed simultaneously on a plurality of recording surfaces 212, whereby the time required for the SSW can be reduced. When the HDD 100 uses the TSA operation for SSW, servo information can be recorded at an accurate position. Note that, at the time of normal reading/writing, the PMA operation or TSA operation different from that in the SSW can be performed.

Figure 7:
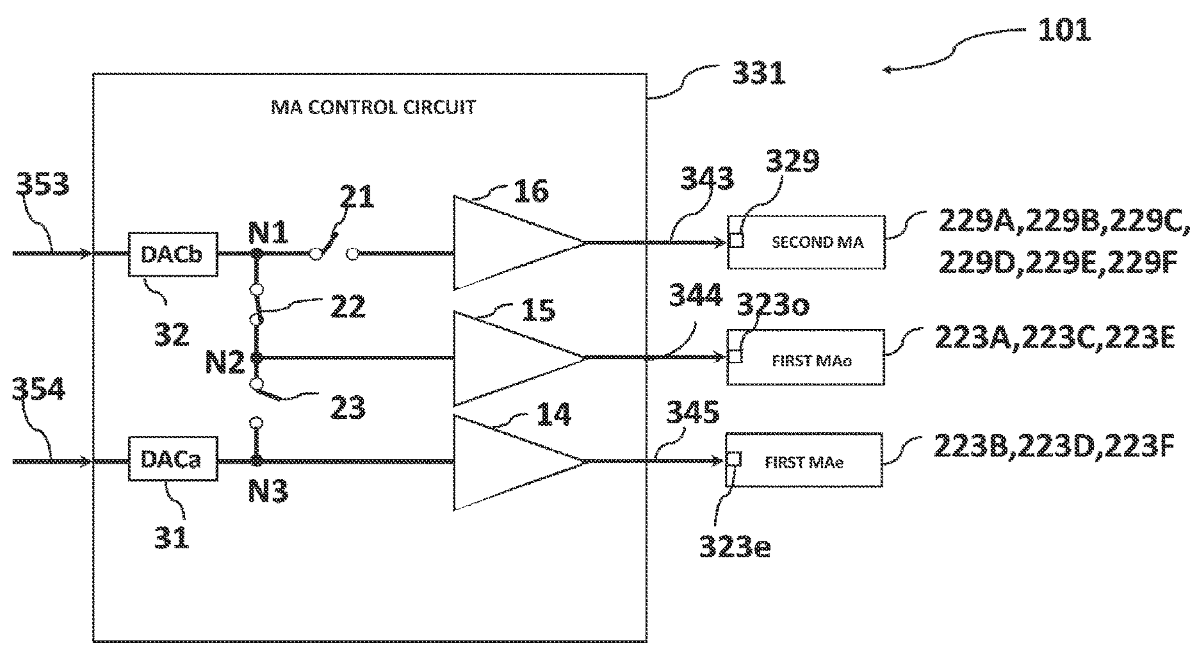
FIG. 7 is a block diagram schematically illustrating an MA control circuit during DSA operation according to a modification of the first embodiment.
Figure 8:
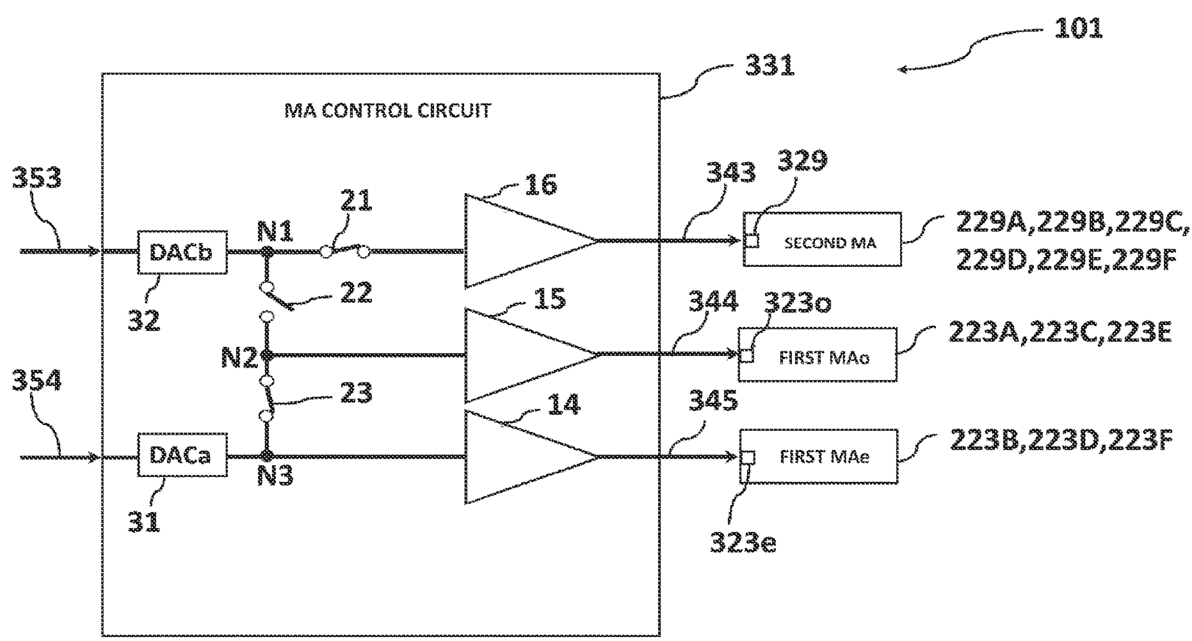
FIG. 8 is a block diagram schematically illustrating the MA control circuit during TSA operation according to the modification of the first embodiment.

Note that, during the PMA operation, the DSA using the first MA 223 and the VCM 128 may be performed instead of the DSA using the second MA 229 and the VCM 128 as a modification of the first embodiment. Such a modification is implemented by the MA control circuit 331 illustrated in FIGS. 7 and 8. FIG. 7 is a block diagram schematically illustrating the MA control circuit 331 during the DSA operation according to the modification of the first embodiment, and FIG. 8 is a block diagram schematically illustrating the MA control circuit 331 during the TSA operation according to the modification of the first embodiment. In the modification of the first embodiment, the second MAs 229A to 229F are all connected to the bus 343, the first MAs 223A, 223C, and 223E are all connected to the bus 344, and the first MAs 223B, 223D, and 223F are all connected to the bus 345.

For example, the time required to move the magnetic head 227 by the same amount and the maximum amount of movement differ between the first MA 223 and the second MA 229. The frequency and amplitude differ between the vibration caused by factors outside the HDD 100 and the vibration caused by factors inside the HDD 100, such as the arm 120. It can be selected whether to perform the PMA operation using the first MA 223 or to perform the PMA operation using the second MA 229 depending on the usage environment or the characteristics of vibration to be compensated. For example, reading/writing operation based on the PMA operation using the first MA 223 can be performed when vibration with a small amplitude is to be compensated.

Furthermore, the first MA 223 may be a gimbal microactuator, for example. The gimbal microactuator operates to cancel the movement for deviating back and forth or up and down with respect to the moving direction of the slider 121 relative to the magnetic disk 210. Even in such a case, it is possible to select whether the PMA operation is performed using the first MA 223 or the PMA operation is performed using the second MA 229 in accordance with the direction of deviation of the magnetic head 227 to be canceled. For example, reading/writing operation based on the PMA operation using the second MA 229 can be performed when the position of the magnetic head 227 in the seek direction is to be adjusted.

As described above, the MA control circuit 331 according to the present embodiment can switch between the PMA operation and the TSA operation using the single-pole switches 21, 22, and 23. Therefore, it is not necessary to separately provide an MA control circuit for PMA operation and an MA control circuit for TSA operation, whereby the space and cost required for mounting the MA control circuit 331 can be reduced.

Hereinafter, operation at the time of SSW of the HDD 100 according to the present embodiment will be described in detail.

Figure 9:
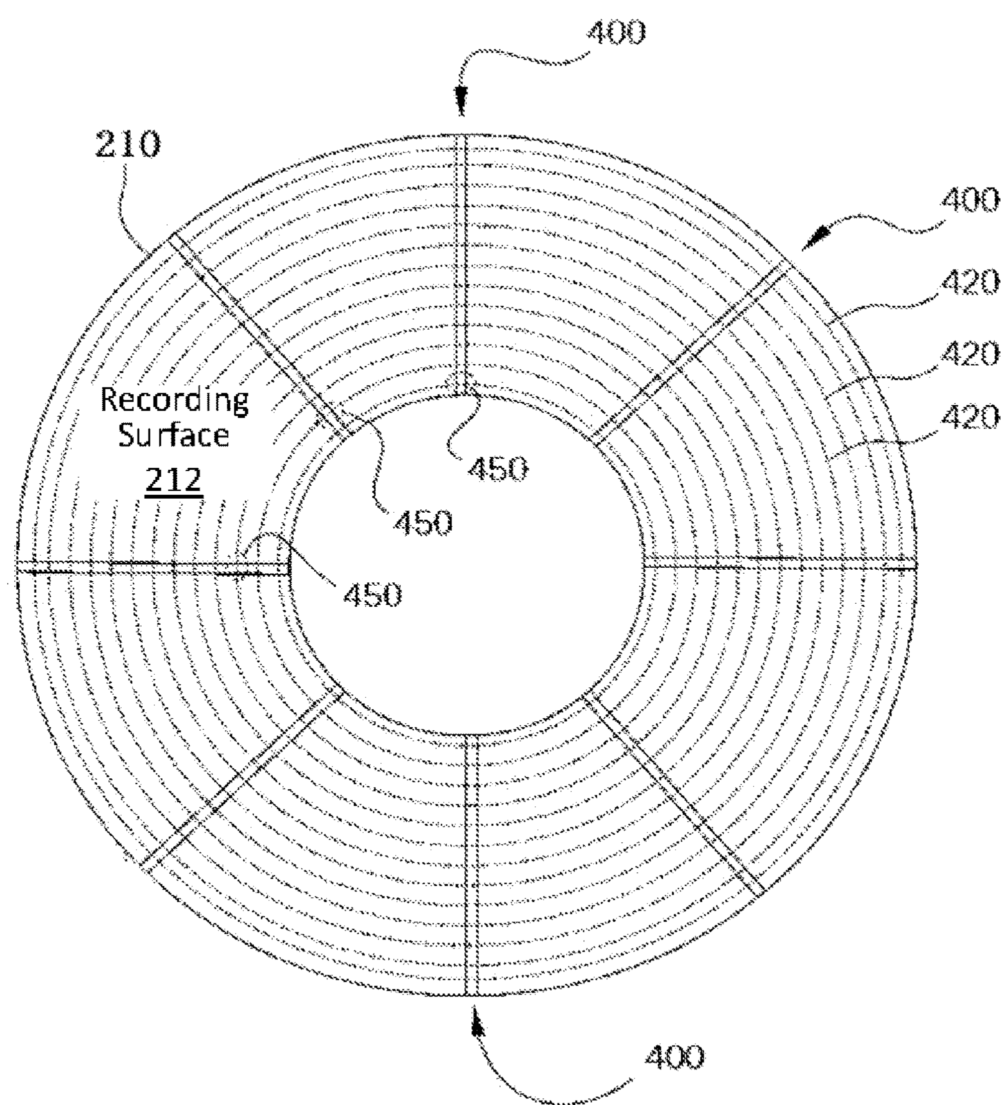
FIG. 9 is a plan view schematically illustrating an exemplary recording surface of a magnetic disk after SSW according to the embodiment.

First, a configuration of the magnetic disk 210 after the SSW according to the present embodiment will be described with reference to FIG. 9. FIG. 9 is a plan view schematically illustrating an example of the recording surface 212 of the magnetic disk 210 after the SSW according to the embodiment.

The concentric track 420 is formed on the recording surface 212. The track 420 has a plurality of sectors (not illustrated) for recording data. In the SSW process, servo information is recorded in a part of the sector of the track 420. An area where the servo information is recorded is a servo area 400, and the servo area 400 has multiple servo sectors 450 that are sectors where the servo information is recorded.

As illustrated in FIG. 9, the servo area 400 may be linearly arranged along the radial direction from the center of the magnetic disk 210. The servo area 400 may be arranged in a curved line along the radial direction from the center of the magnetic disk 210. It may be a pattern in which the trajectory of the magnetic head 227 at the time when the VCM 128 rotates while the magnetic disk 210 is not rotating is transferred onto the magnetic disk 210, for example.

The position of the track 420 for recording data is defined by the servo information written in the servo area 400. The number of the tracks 420 illustrated in FIG. 9 is only illustrative, and is not limited thereto.

During the SSW for recording the servo information, the magnetic head 227 is positioned in the radial direction of the magnetic disk 210 on the basis of the timing information and the positional information read from temporary servo positional information (spiral 510).

Figure 10:
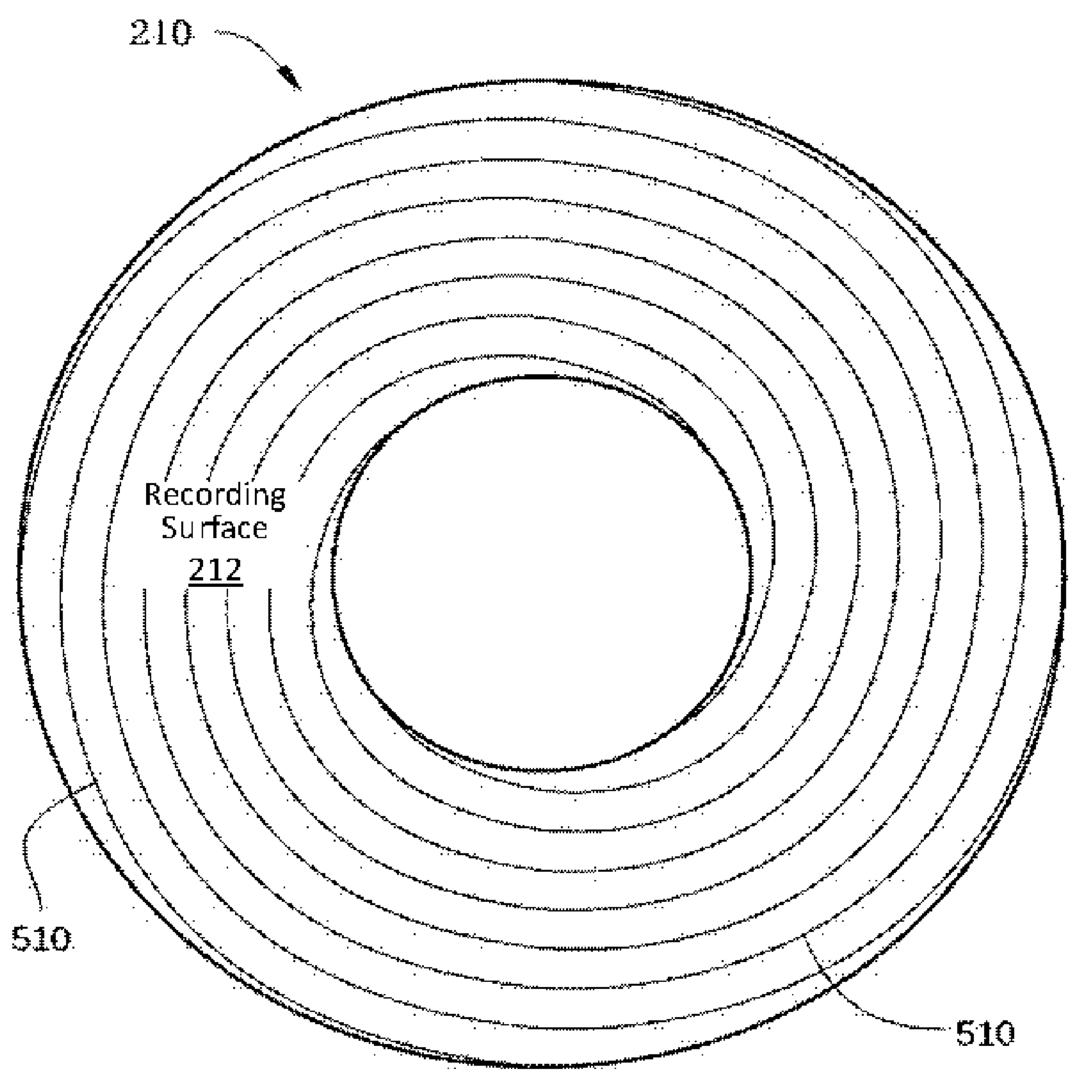
FIG. 10 is a plan view schematically illustrating an exemplary recording surface of the magnetic disk before SSW according to the embodiment.

The spiral 510 will be described with reference to FIG. 10. FIG. 10 is a plan view schematically illustrating an example of the recording surface 212 of the magnetic disk 210 before the SSW according to the embodiment.

As illustrated in FIG. 10, the magnetic disk 210 includes a plurality of the spirals 510. The spiral has a magnetic pattern provided along a spiral trajectory extending from the innermost circumference to the outermost circumference of the recording surface 212. The spiral trajectory maintains a prescribed angle of inclination with respect to the radius of the magnetic disk 210. Each of the spirals 510 is disposed at a predetermined interval from the adjacent spiral 510. In the SSW, the magnetic head 227 reads the magnetic pattern at the time of crossing the spiral 510 and performs demodulation, thereby obtaining positional information. Note that the number of the spirals 510 illustrated in FIG. 10 is only illustrative, and is not limited thereto.

Figure 11:
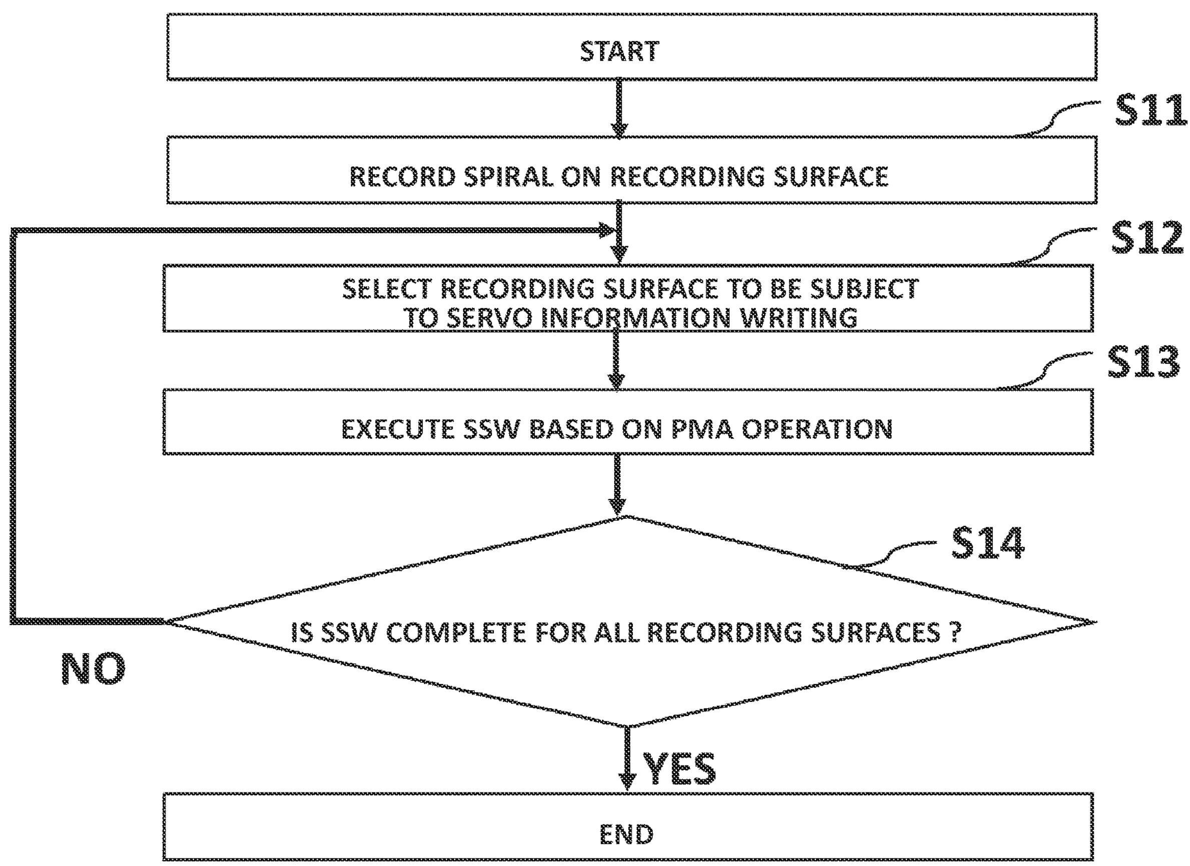
FIG. 11 is a flowchart illustrating operation of the HDD during SSW based on PMA operation.

Operation of the HDD 100 at the time of the SSW based on the PMA operation will be described with reference to FIG. 11. FIG. 11 is a flowchart illustrating operation of the HDD 100 during the SSW based on the PMA operation. Each step of the SSW is executed by the MBC 133.

In step S11, the spiral 510 is written on the recording surfaces 212A to 212F. The spiral 510 is written on the magnetic heads 227A to 227F using an algorithm for writing the spiral 510 that is technically feasible. The spiral 510 may be written by a media writer outside the HDD 100 without using the magnetic head 227.

In step S12, the recording surface 212 on which the servo information is to be written next is selected from the recording surfaces 212 on which no servo information is written. A total of two target recording surfaces 212 are selected including one from the recording surface 212*o* and one from the recording surface 212*e*. For example, the recording surface 212A and the recording surface 212B are selected.

In step S13, the servo information is written on the recording surface 212 selected in step S12.

In this step, the VCM servo system positions all the magnetic heads 227 including the magnetic head 227A and the magnetic head 227B using the VCM actuator 224. The magnetic head 227A and the magnetic head 227B are disposed at different recording surfaces 212, that is, at appropriate positions (tracks 420) on the recording surface 212A and the recording surface 212B, by the VCM servo system.

A second MAo servo system (CPU 301, HDC 302, read/write channel 137, head amplifier 320, MA control circuit 331, and second MA 229*o*) of the HDD 100 finely positions the magnetic head 227A, and a second MAe servo system (CPU 301, HDC 302, read/write channel 137, head amplifier 320, MA control circuit 331, and second MA 229*e*) finely positions the magnetic head 227B.

Each of the VCM 128 servo system, the second MAo servo system, and the second MAe servo system obtains positional information and timing information from the spiral 510. The second MAo servo system and the second MAe servo system obtain positional information and timing information from the spirals 510 recorded on different recording surfaces 212, respectively. Therefore, the position of the magnetic head 227*o* is controlled independently from the position of the magnetic head 227*e* via the second MA 229*o*.

The MBC 133 causes the magnetic head 227A to write servo information at the target position on the recording surface 212A at the same time as the position of the magnetic head 227A is controlled. In parallel with this, the MBC 133 causes the magnetic head 227B to write servo information at the target position on the recording surface 212B at the same time as the position of the magnetic head 227B is controlled.

In step S14, it is determined whether the SSW has been complete for all of the recording surfaces 212. If servo information has been recorded on all of the recording surfaces 212, the SSW operation is terminated. If there is a recording surface 212 on which no servo information has been recorded, the process returns to step S12.

As described above, when the PMA operation is used for the SSW, the HDD 100 can simultaneously perform servo writing on a plurality of recording surfaces 212, whereby the time required for the SSW can be reduced. Furthermore, at the time of normal reading/writing, the HDD 100 can selectively perform the PMA operation or the TSA operation.

Figure 12:
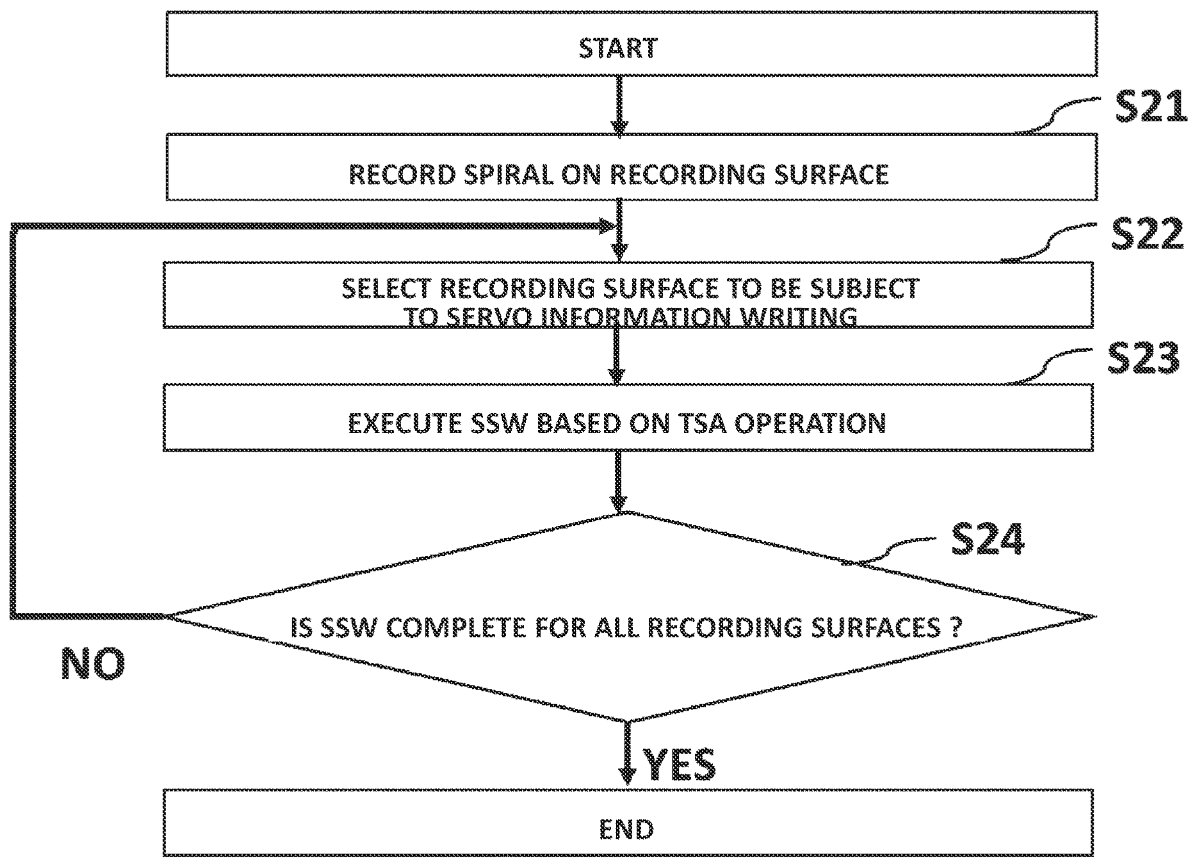
FIG. 12 is a flowchart illustrating operation of the HDD during SSW based on TSA operation.

Operation of the HDD 100 at the time of the SSW based on the TSA operation will be described with reference to FIG. 12. FIG. 12 is a flowchart illustrating operation of the HDD 100 during the SSW based on the TSA operation. Each step of the SSW is executed by the MBC 133.

In a similar manner to step S11, in step S21, the spiral 510 is written on the recording surfaces 212A to 212F. The spiral 510 may be written by an external media writer. The spiral 510 is written on the magnetic heads 227A to 227F using an algorithm for writing the spiral 510 that is technically feasible.

In the next step S22, the recording surface 212 on which the servo information is to be written next is selected from the recording surfaces 212 on which no servo information is written. One target recording surface 212 is selected from the recording surface 212*o* and the recording surface 212*e*. For example, the recording surface 212C is selected.

In step S23, the servo information is written on the recording surface 212 selected in step S22.

In this step, the VCM servo system (CPU 301, HDC 302, read/write channel 137, head amplifier 320, VCM control circuit 317, and VCM 128) positions all the magnetic heads 227 including the magnetic head 227C using the VCM actuator 224. The magnetic head 227C is disposed at an appropriate position (track 420) on the corresponding recording surface 212C.

The second MA servo system (CPU 301, HDC 302, read/write channel 137, head amplifier 320, MA control circuit 315, and second MA 229) of the HDD 100 finely positions the magnetic head 227C, and a first MA 223 servo system (CPU 301, HDC 302, read/write channel 137, head amplifier 320, MA control circuit 331, and first MA 223) further finely adjusts the position of the magnetic head 227C.

The VCM 128 servo system, the second MA servo system, and the first MA servo system obtain positional information and timing information from the spiral 510 of the recording surface 212C to be written.

The MBC 133 causes the magnetic head 227C to write servo information at the target position on the recording surface 212C at the same time as the position of the magnetic head 227C is controlled.

In step S24, it is determined whether the SSW has been complete for all of the recording surfaces 212. If servo information has been recorded on all of the recording surfaces 212, the SSW operation is terminated. If there is a recording surface 212 on which no servo information has been recorded, the process returns to step S22.

As described above, when the TSA operation is used for the SSW, it becomes possible to record the servo information at an appropriate position with accuracy higher than that of the PMA operation (DSA operation) on the basis of position control of the magnetic head 227 using the triple-stage actuator. Furthermore, at the time of normal reading/writing, the HDD 100 can selectively perform the PMA operation or the TSA operation.

While, the usage of the SSW and the normal reading/writing operation has been described above, it is also possible to switch between the PMA operation and the TSA operation during the SSW operation. Hereinafter, switching between the PMA operation and the TSA operation during the SSW operation will be described in detail.

First, a relationship between the distance between the reference surface and the recording surface 212 to be subject to servo writing and deviation of the servo area 400 will be described.

Before the SSW operation, the servo area 400 to be a reference is recorded on a certain recording surface 212 (reference surface). In a case where the recording surface 212A in FIG. 3 is a reference surface during the SSW, for example, the servo areas 400 of the recording surfaces 212B to 212F are written with reference to the servo area 400 of the recording surface 212A.

During the SSW, when a physical distance between the reference surface (recording surface 212A) and the recording surface 212 to be subject to servo writing increases, deviation between the servo area 400 of the reference surface and the servo area 400 of the recording surface 212 having been subject to the servo writing increases. In other words, the positional deviation between the servo area of the recording surface 212A and the servo area 400 of the recording surface 212E is larger than the positional deviation between the servo area of the recording surface 212A and the servo area 400 of the recording surface 212C.

Figure 13:
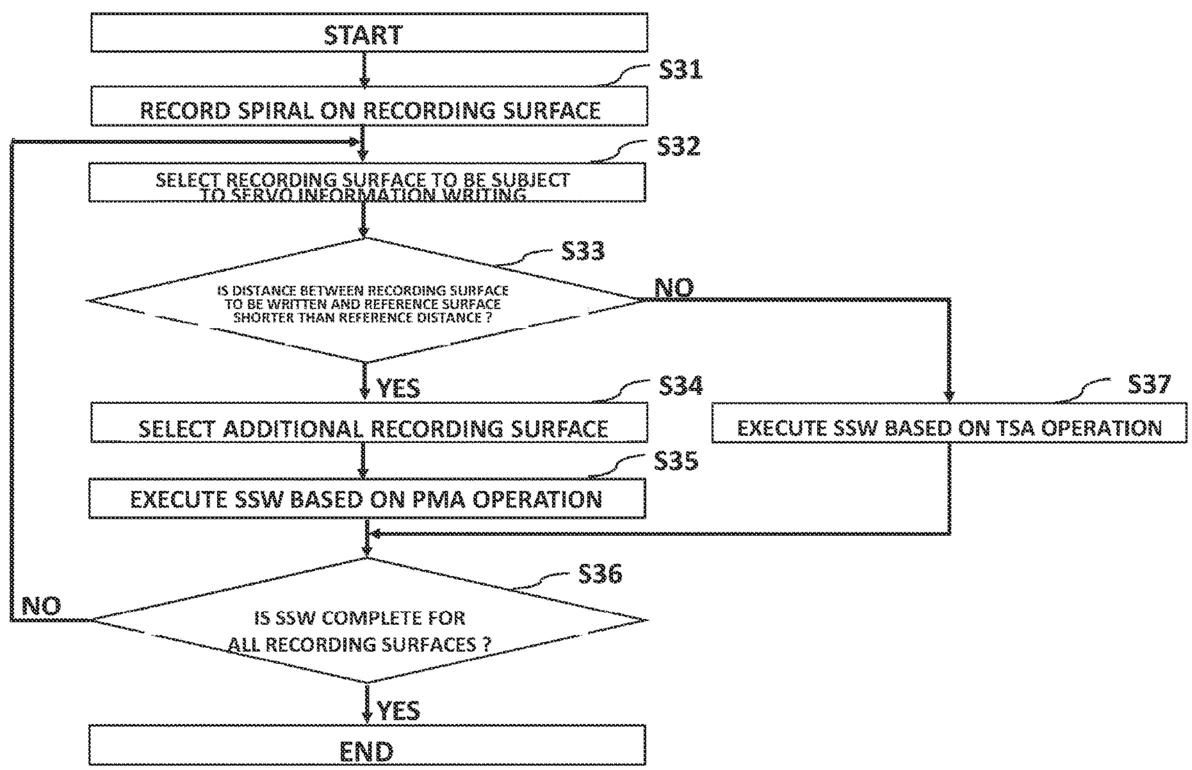
FIG. 13 is a flowchart of SSW for switching between PMA operation and TSA operation depending on a distance between a reference surface and a recording surface to be subject to SSW.

As exemplified in FIG. 13, in the present embodiment, it is possible to switch between the PMA operation and the TSA operation depending on the distance between the recording surface 212 to be subject to SSW and the reference surface. FIG. 13 is a flowchart of the SSW for switching between the PMA operation and the TSA operation depending on the distance between the reference surface and the recording surface to be subject to the SSW.

First, in step S31, the spiral 510 is recorded on the recording surface 212.

Next, in step S32, one recording surface 212 to be subject to servo information writing is selected. For example, the recording surface 212 close to the reference surface (recording surface 212A) is preferentially selected. For example, the recording surface 212B is selected as a target recording surface 212.

In step S33, it is determined whether the distance between the recording surface 212 to be written and the reference surface is shorter than a reference distance, and the process proceeds to step S34 if it is shorter, and proceeds to step S37 if it is not shorter. The reference distance is optionally set. The reference distance may be held in a random access memory (RAM) 134, for example. The reference distance can be set to a value equal to the distance between the recording surface 212A and the recording surface 212C, for example. If the recording surface 212B is selected, the process proceeds to step S34.

In step S34, one additional recording surface 212 to be subject to the servo information writing is selected, and the process proceeds to step S35. At this time, if any of the recording surface 212*o* is selected in step S32, an additional recording target is selected from the recording surface 212*e*, and if any of the recording surface 212*e* is selected in step S32, an additional recording target is selected from the recording surface 212*o*. In this step, for example, the recording surface 212 close to the reference surface (recording surface 212A) is preferentially selected. For example, the recording surface 212C is selected as a recording surface 212 to be added.

In step S35, SSW is performed on the recording surfaces 212B and 212C to be written on the basis of the PMA operation, and the process proceeds to S36. For example, servo information is simultaneously recorded on the recording surfaces 212B and 212C.

In step S36, it is determined whether the SSW has been complete for all of the recording surfaces 212. If servo information has been recorded on all of the recording surfaces 212, the SSW operation is terminated. If there is a recording surface 212 on which no servo information has been recorded, the process returns to step S32. If the SSW has been complete only for the recording surfaces 212B and 212C, the process returns to step S32.

Returning to step S32, for example, the recording surface 212D is selected. In that case, since the distance between the reference surface (recording surface 212A) and the recording surface 212D is longer than the reference distance (distance between the recording surface 212A and the recording surface 212C) in step S33, the process proceeds to step S37.

In step S37, SSW is performed on the recording surface 212 to be written on the basis of the TSA operation, and the process proceeds to step S36. In step S36, servo information is recorded on the recording surface 212D.

Returning to step S36, steps S32 to S36 are repeated until the SSW is complete for all the recording surfaces 212.

According to the flowchart of FIG. 13, the SSW based on the DSA, which is based on the PMA operation, is simultaneously performed on the two recording surfaces 212 with small positional deviation of the servo area 400, that is, the recording surfaces 212 with a distance to the reference surface shorter than the optionally set reference distance, whereby the time required for the SSW can be reduced. In addition, the position of the magnetic head 227 is precisely controlled on the basis of the TSA operation for the recording surface 212 with large positional deviation of the servo area 400, that is, the recording surface 212 with a distance to the reference surface longer than the reference distance, whereby the deviation from the target position of the servo area 400 can be reduced.

The determination for switching between the PMA operation and the TSA operation is not limited to being based on the distance between the reference surface and the recording surface 212 to be subject to servo writing. For example, it is possible to switch between the PMA operation and the TSA operation on the basis of the number of the magnetic disks 210 between the reference surface and the recording surface 212 to be subject to servo writing or on the basis of the number of the recording surfaces 212 having been subject to the SSW.

As described above, the MA control circuit 331 according to the present embodiment can switch between the PMA operation and the TSA operation using the single-pole switches 21, 22, and 23. Therefore, it is not necessary to separately provide the MA control circuit 331 for PMA operation and the MA control circuit 331 for TSA operation, whereby the space and cost required for mounting the MA control circuit 331 can be reduced.

Furthermore, with the configuration in which the PMA operation and the TSA operation can be optionally switched during the SSW as in the present embodiment, the time required for the SSW can be reduced, and the SSW can be performed precisely.

Second Embodiment

An HDD 200 according to a second embodiment will be described.

Note that descriptions of functions, configurations, operations, and the like similar to those in the first embodiment embodiment will be omitted. A method of SSW is similar to that in the first embodiment.

Figure 14:
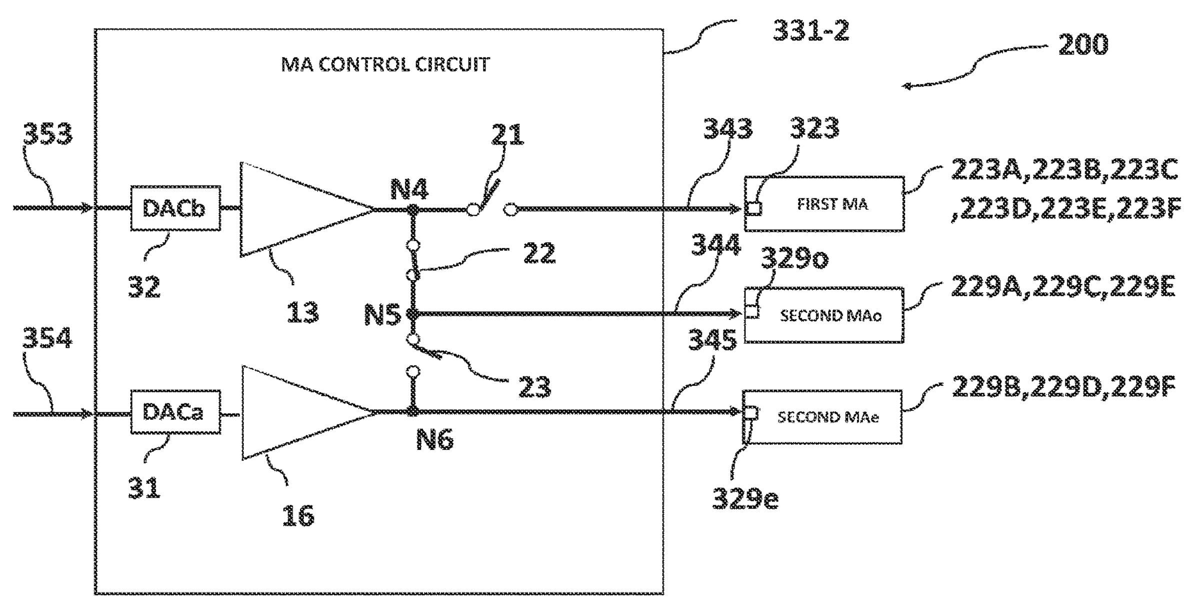
FIG. 14 is a block diagram schematically illustrating an MA control circuit during PMA operation according to a second embodiment.
Figure 15:
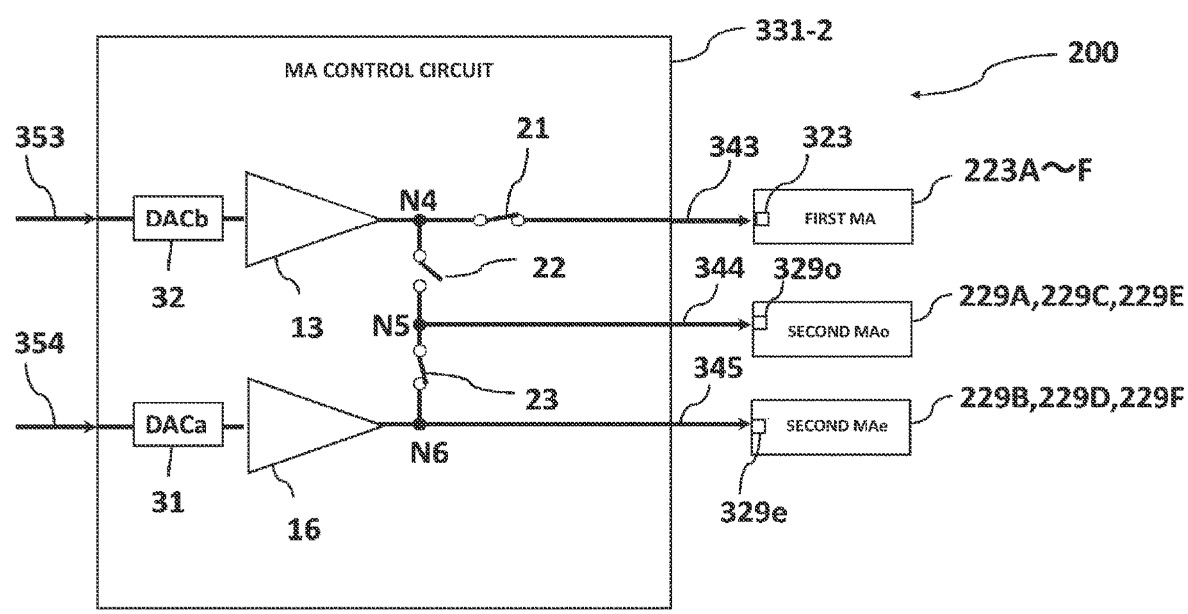
FIG. 15 is a block diagram schematically illustrating the MA control circuit during TSA operation according to the second embodiment.

In the second embodiment, a configuration of an MA control circuit 331-2 is different from that of the MA control circuit 331 according to the first embodiment. An exemplary configuration of the MA control circuit 331-2 will be described with reference to FIGS. 14 and 15. FIG. 14 is a block diagram schematically illustrating the MA control circuit 331-2 during PMA operation according to the second embodiment. FIG. 15 is a block diagram schematically illustrating the MA control circuit 331-2 during TSA operation according to the second embodiment.

As illustrated in FIG. 14, the MA control circuit 331-2 according to the second embodiment includes a DACa 31, a DACb 32, a single-pole switch 21, a single-pole switch 22, a single-pole switch 23, a second amplifier 16, and a first amplifier 13. The amplification factor of the second amplifier 16 is equal to the amplification factor of the first amplifier 13.

A signal line 353 is electrically connected to the input terminal of the DACb 32. The output terminal of the DACb 32 is electrically connected to the input terminal of the first amplifier 13. The output terminal of the first amplifier 13 is electrically connected to one end of the single-pole switch 21 at a node N4. The other end of the single-pole switch 21 is electrically connected to a bus 343.

One end of the single-pole switch 22 is electrically connected to the output terminal of the DACb 32 at the node N4. The other end of the single-pole switch 22 is electrically connected to a bus 344 and one end of the single-pole switch 23 at a node N5.

A signal line 354 is electrically connected to the input terminal of the DACa 31. The output terminal of the DACa 31 is electrically connected to the input terminal of the second amplifier 16. The output terminal of the second amplifier 16 is electrically connected to the other end of the single-pole switch 23 and a bus 345 at a node N6.

The bus 343 is electrically connected to one end of a driver 323 of a first MA 223. The other end of the driver 323 has a ground potential or a reference potential. The bus 344 is electrically connected to one end of a driver 329*o* of a second MAo 229*o*. The other end of the driver 329*o* has a ground potential or a reference potential. The bus 345 is electrically connected to one end of a driver 329*e* of a second MAe 229*e*. The other end of the driver 329*e* has a ground potential or a reference potential.

The single-pole switch 21 controls on/off between the node N4 and the bus 343. The single-pole switch 22 controls on/off between the node N4 and the node N5. The single-pole switch 23 controls on/off between the node N5 and the node N6.

As illustrated in FIG. 14, in the PMA operation according to the second embodiment, the conduction states of the single-pole switches 21 to 23 of the MA control circuit 331-2 are that the single-pole switch 21 is off, the single-pole switch 22 is on, and the single-pole switch 23 is off. The DACb 32 converts digital signals input from the signal line 353 into analog signals. The DACa 31 converts the digital signals input from the signal line 354 into analog signals. The first amplifier 13 amplifies the analog signals output from the DACb 32. The second amplifier 16 amplifies analog signals output from the DACa 31. The second MA 229*o* receives the signals amplified by the first amplifier 13, and moves a magnetic head 227*o*. The second MA 229*e* receives the signals amplified by the second amplifier 16, and moves a magnetic head 227*e*. In this manner, since the position of the magnetic head 227 is controlled by a total of two stages of actuators of a second MA 229 and a VCM actuator 224 in the PMA operation, the HDD 200 substantially operates as a DSA. Note that no signal is input to the first MA 223*o* and the first MA 223*e*, and no displacement occurs.

As illustrated in FIG. 15, in the TSA operation according to the second embodiment, the conduction states of the single-pole switches 21 to 23 of the MA control circuit 331-2 are that the single-pole switch 21 is on, the single-pole switch 22 is off, and the single-pole switch 23 is on. The DACb 32 converts digital signals input from the signal line 353 into analog signals. The DACa 31 converts the digital signals input from the signal line 354 into analog signals. The first amplifier 13 amplifies the analog signals converted by the DACb 32. The second amplifier 16 amplifies the analog signals converted by the DACa 31. The first MA 223*o* and the first MA 223*e* receive the signals amplified by the first amplifier 13, and move the magnetic head 227*o* and the magnetic head 227*e* by the same amount in the same direction. The second MA 229*e* and the second MA 229*o* receive the signals amplified by the second amplifier 16, and move the magnetic head 227*o* and the magnetic head 227*e* by the same amount in the same direction.

Figure 16:
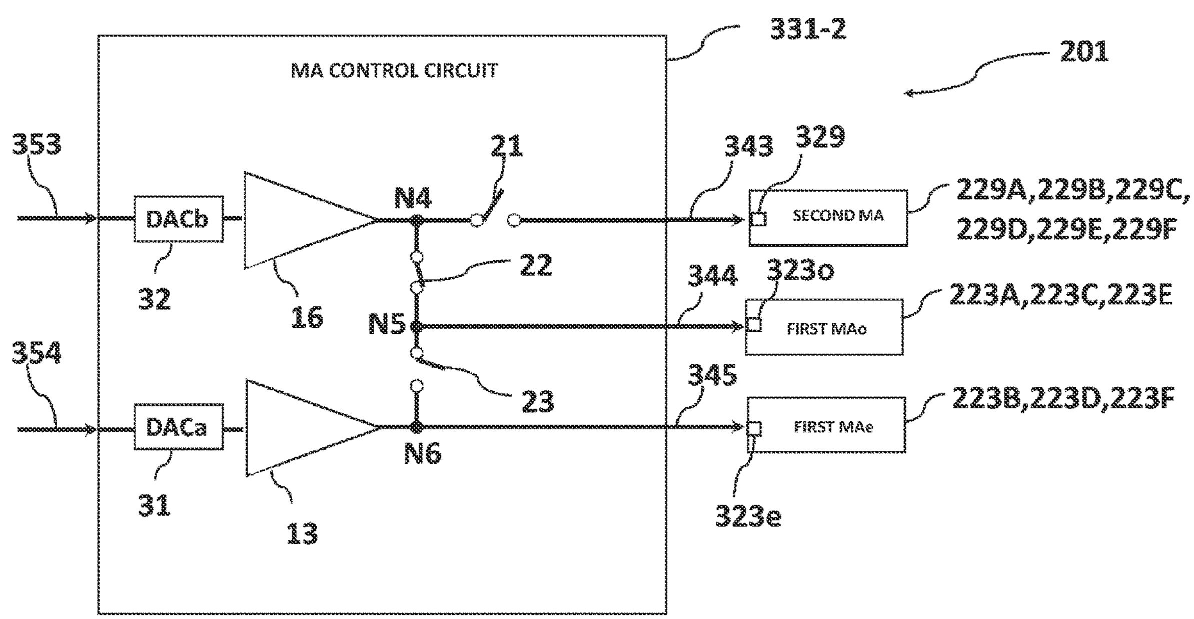
FIG. 16 is a block diagram schematically illustrating an MA control circuit during PMA operation according to a modification of the second embodiment.
Figure 17:
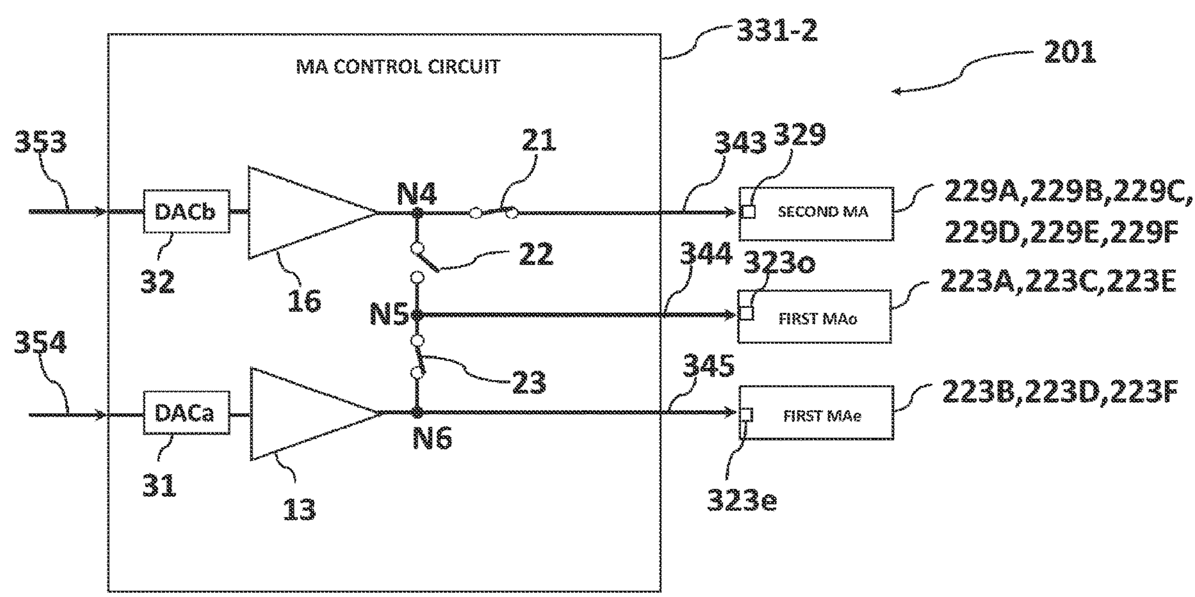
FIG. 17 is a block diagram schematically illustrating the MA control circuit during TSA operation according to the modification of the second embodiment.

Note that, during the PMA operation, the DSA using the first MA 223 and a VCM 128 may be performed instead of the DSA using the second MA 229 and the VCM 128 as a modification of the second embodiment. Such a modification is implemented by the MA control circuit 331-2 illustrated in FIGS. 16 and 17. FIG. 16 is a block diagram schematically illustrating the MA control circuit 331-2 during the PMA operation according to the modification of the second embodiment, and FIG. 17 is a block diagram schematically illustrating the MA control circuit 331-2 during the TSA operation according to the modification of the second embodiment. In the modification of the second embodiment, second MAs 229A to 229F are all connected to the bus 343, first MAs 223A, 223C, and 223E are all connected to the bus 344, and first MAs 223B, 223D, and 223F are all connected to the bus 345.

According to the second embodiment, the number of amplifiers to be mounted on the MA control circuit 331-2 can be reduced as compared with that in the first embodiment, whereby the space and cost required for mounting the MA control circuit 331-2 can be reduced. In addition, in a similar manner to the first embodiment, it is not necessary to separately provide the MA control circuit 331-2 for PMA operation and the MA control circuit 331-2 for TSA operation, whereby the space and cost required for mounting the MA control circuit 331-2 can be reduced.

Third Embodiment

An HDD 300 according to a third embodiment will be described. Note that descriptions of functions, configurations, operations, and the like similar to those in the first embodiment and the second embodiment will be omitted.

Figure 18:
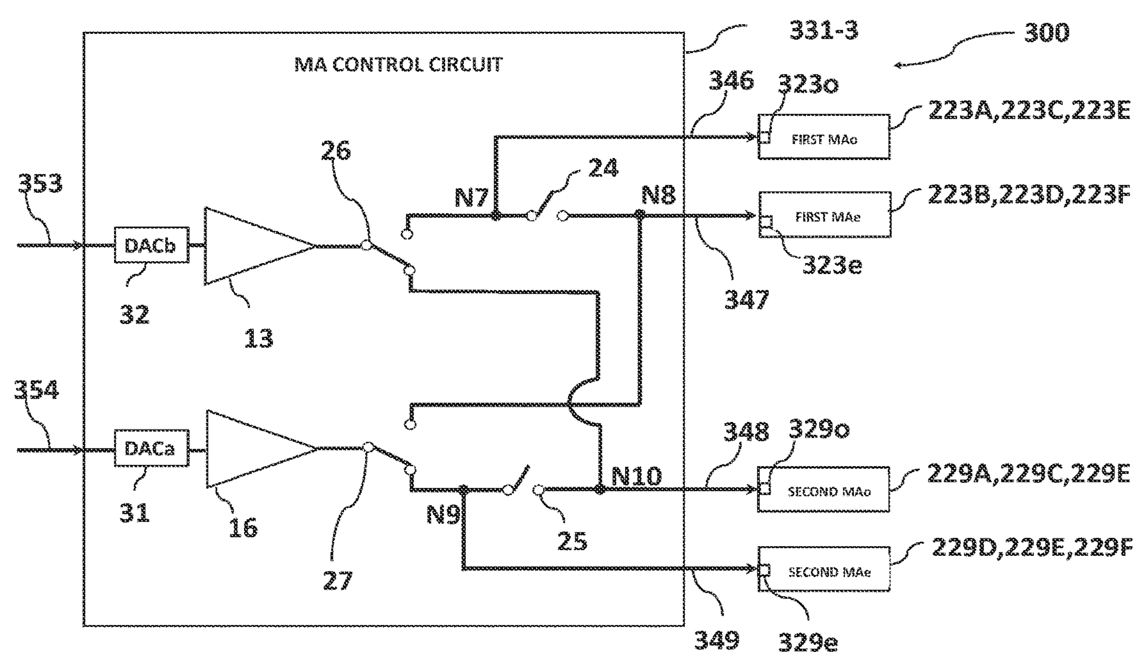
FIG. 18 is a block diagram schematically illustrating an MA control circuit during PMA operation using a second MA according to a third embodiment.
Figure 19:
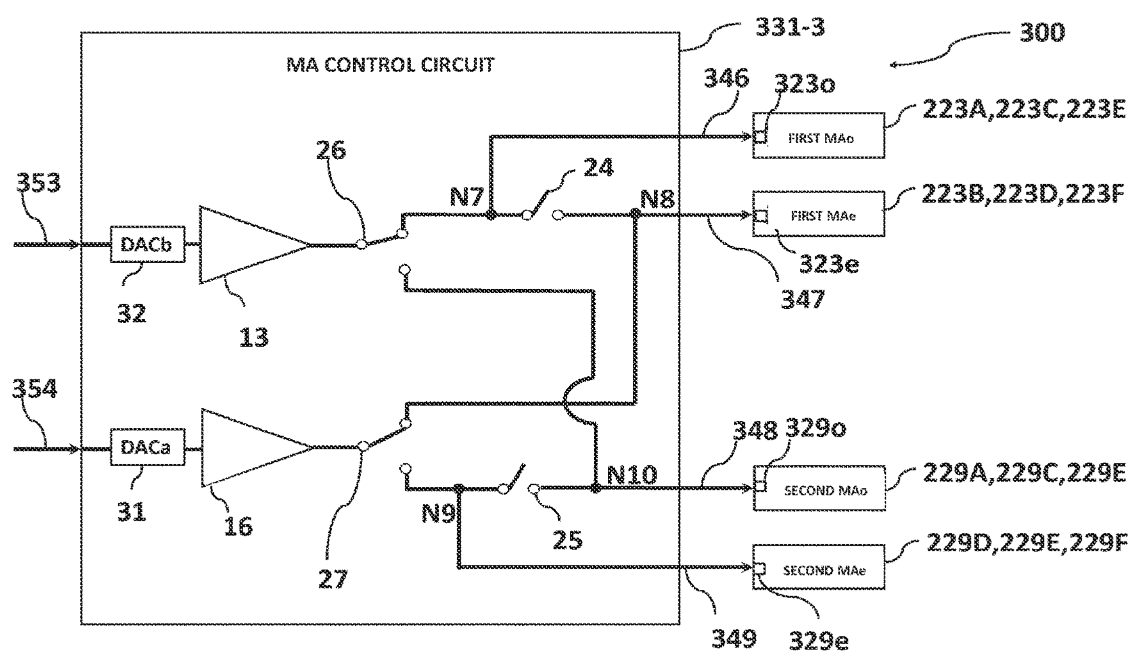
FIG. 19 is a block diagram schematically illustrating the MA control circuit during PMA operation using a first MA according to the third embodiment.
Figure 20:
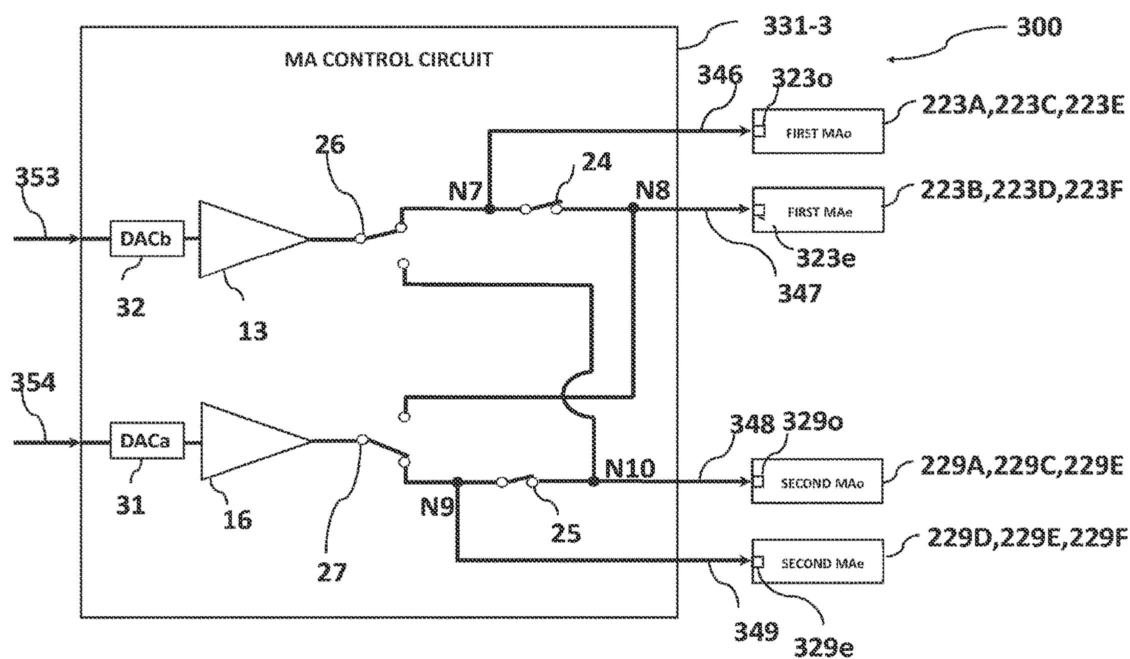
FIG. 20 is a block diagram schematically illustrating the MA control circuit during TSA operation according to the third embodiment.

The third embodiment is different from the first embodiment in that PMA operation using a first MA 223, PMA operation using a second MA 229, and TSA operation can be switched. An exemplary configuration of an MA control circuit 331-3 according to the third embodiment will be described with reference to FIGS. 18, 19, and 20. FIG. 18 is a block diagram schematically illustrating the MA control circuit 331-3 during the PMA operation using the second MA 229 according to the third embodiment. FIG. 19 is a block diagram schematically illustrating the MA control circuit 331-3 during the PMA operation using the first MA 223 according to the third embodiment. FIG. 20 is a block diagram schematically illustrating the MA control circuit 331-3 during the TSA operation according to the third embodiment.

The MA control circuit 331-3 according to the third embodiment includes a DACa 31, a DACb 32, a second amplifier 16, a first amplifier 13, single-pole switches 24 and 25, and three-way switches 26 and 27. Note that, in the present specification, the three-way switch indicates a single-pole double-throw switch that operates one circuit with one operation and switches one of two lines on and the other off. The three-way switch included in the MA control circuit 331-3 can be replaced with two single-pole switches.

As illustrated in FIG. 18, a signal line 353 is electrically connected to the input terminal of the DACb 32. The output terminal of the DACb 32 is electrically connected to the input terminal of the first amplifier 13. One end of the three-way switch 26 is electrically connected to the output terminal of the first amplifier 13. Another end of the three-way switch 26 is electrically connected to, at a node N7, one end of the single-pole switch 24 and one end of a driver 323*o* of a first MAo 223*o* via a bus 346. The other end of the driver 323*o* has a ground potential or a reference potential. The remaining end of the three-way switch 26 is electrically connected to one end of a driver 329*o* of a second MAo 229*o* via a bus 348 at a node N10. The other end of the driver 329*o* has a ground potential or a reference potential.

A signal line 354 is electrically connected to the input terminal of the DACa 31. The output terminal of the DACa 31 is electrically connected to the input terminal of the second amplifier 16. One end of the three-way switch 27 is connected to the output terminal of the second amplifier 16. Another end of the three-way switch 27 is electrically connected to, at a node N9, one end of the single-pole switch 25 and one end of a driver 329*e* of a second MAe 229*e* via a bus 349. The other end of the driver 329*e* has a ground potential or a reference potential. The remaining end of the three-way switch 27 is electrically connected to, at a node N8, the other end of the single-pole switch 24 and one end of a driver 323*e* of a first MAe 223*e* via a bus 347. The other end of the driver 323*e* has a ground potential or a reference potential. The other end of the single-pole switch 25 is electrically connected to, at N10, the remaining end of the three-way switch 26 and one end of the driver 329*o* of the second MAo 229*o* via the bus 348. The other end of the driver 329*o* has a ground potential or a reference potential.

The single-pole switch 24 controls on/off between the node N7 and the node N8. The single-pole switch 25 controls on/off between the node N9 and the node N10.

The three-way switch 26 performs switching in such a manner that one of an electrical conduction state between the first amplifier 13 and the node N7 and an electrical conduction state between the first amplifier 13 and the node N10 is turned on and the other is turned off. The three-way switch 27 performs switching in such a manner that one of an electrical conduction state between the second amplifier 16 and the node N8 and an electrical conduction state between the second amplifier 16 and the node N9 is turned on and the other is turned off.

As illustrated in FIG. 18, during the PMA operation using the second MA 229, the single-pole switch 24 is off, the single-pole switch 25 is off, the three-way switch 26 is connected to the node N10, and the three-way switch 27 is connected to the node N9. At this time, the second MA 229*o* and the second MA 229*e* operate in a mutually independent manner, and a magnetic head 227*o* and a magnetic head 227*e* corresponding to the respective MAs simultaneously execute reading/writing operation.

As illustrated in FIG. 19, during the PMA operation using the first MA 223, the single-pole switch 24 is off, the single-pole switch 25 is off, the three-way switch 26 is connected to the node N7, and the three-way switch 27 is connected to the node N8. At this time, a second MA 223*o* and a second MA 223*e* operate in a mutually independent manner, and the magnetic head 227*o* and the magnetic head 227*e* corresponding to the respective MAs simultaneously execute reading/writing operation.

As illustrated in FIG. 20, during the TSA operation, the single-pole switch 24 is on, the single-pole switch 25 is on, the three-way switch 26 is connected to the node N7, and the three-way switch 27 is connected to the node N9. At this time, both of the second MA 229 and the first MA 223 operate to move the magnetic head 227 to a target accurate position. As described above, the MA control circuit 331-3 according to the third embodiment can switch between the PMA operation control and the TSA operation control using the single-pole switches 24 and 25 and the three-way switches 26 and 27. Therefore, it is not necessary to separately provide an MA control circuit 331 for PMA operation and an MA control circuit 331 for TSA operation, whereby the space and cost required for mounting the MA control circuit 331 can be reduced.

Furthermore, according to the third embodiment, it is possible to switch between the PMA operation using the second MA 229 and the PMA operation using the first MA 223. Therefore, with the PMA operation being switched depending on the usage environment or the characteristics of vibration to be compensated, accuracy in position control of the magnetic head 227 during the PMA operation can be improved.

According to the HDD in at least one of the embodiments described above, the PMA operation and the TSA operation can be switched. Particularly in SSW, it is possible to selectively use the PMA operation in which recording is simultaneously performed on a plurality of recording surfaces 212 so that the SSW time can be shortened and the TSA operation capable of performing precise position control depending on the recording surface 212 to be subject to recording. Furthermore, it is not necessary to separately provide the MA control circuit for PMA operation and the MA control circuit 331 for TSA operation, whereby the space and cost required for mounting the MA control circuit 331 can be reduced.

The HDD 100 according to the present invention is not limited to the aspects described above, and various modifications can be made.

The function of each part of the HDD 100 according to each embodiment illustrated in FIG. 4 may be implemented by dedicated hardware instead of the MBC 133 and the motor driver chip 125.

In the first embodiment, the same operation has been described as operation in which no signal is input to a plurality of MAs and both of the MAs are not displaced. However, the same operation includes operation in which the same signals are continuously input to the plurality of MAs so that both of the MAs are not displaced. For example, when the first embodiment is in the switching state of FIG. 5, the first amplifier 13 is connected to the conductive single-pole switch 21, whereby analog signals output from the DACa 31 or the DACb 32 are not input thereto. The first amplifier 13 is connected to the single-pole switch 21, and is capable of outputting predetermined signals obtained by amplifying a potential difference between an input terminal to which no analog signals are input and another input terminal (not illustrated) connected to a reference potential source. The first MAs 223A to 223F are displaced with reference to the positions at the time when predetermined signals are input. That is, the first MAs 223A to 223F perform the same operation without displacement by the same predetermined signals being continuously input thereto. Alternatively, the operation of the first MAs 223A to 223F at this time may be included in the operation of being displaced by the same amount in the same direction where the displacement is zero.

The combination of switching states of the single-pole switches 24 and 25 and the three-way switches 26 and 27 of the MA control circuit 331-3 according to the third embodiment is not limited to FIGS. 18, 19, and 20. For example, the single-pole switch 24 can be turned on, the single-pole switch 25 can be turned off, the three-way switch 26 can be connected to the node N7, and the three-way switch 27 can be connected to the node N9. At this time, the first MAe 223*e* and the first MAo 223*o* receive the same signals, and perform the same operation of being displaced by the same amount in the same direction. The second MAe 229*e* receives signals different from those received by the first MAe 223*e*, and operates independently from the first MAe 223*e*. The second MAo 229*o* receives no signal, and is not displaced. The first MAe 223*e* and the first MAo 223*o* perform different operations in a mutually independent manner. In such a switching state, the MA control circuit 331-3 can control the MA servo system corresponding to e on the basis of TSA operation, and can control the MA servo system corresponding to o on the basis of DSA operation. At this time, the first MAe 223*e* and the first MAo 223*o* perform different operations in a mutually independent manner, whereby PMA operation using TSA operation is partially implemented.

The MA servo system corresponding to the recording surface 212 does not need to be distinguished according to whether the number assigned to the recording surface 212 in order from one end is an add number or an even number (o or e). For example, it is possible to divide MA servo systems into two including an MA servo system corresponding to the recording surface 212 (DEF) with an alphabet late in an alphabetical order and an MA servo system corresponding to the recording surface 212 (ABC) with an alphabet early in the alphabetical order.

In the MA servo system corresponding to the recording surface 212, the number of the recording surfaces 212 corresponding to a certain servo system does not necessarily correspond to the number of the recording surfaces 212 corresponding to another MA servo system. For example, it is possible to divide MA servo systems into an MA servo system corresponding to the recording surface 212 (AB) and an MA servo system corresponding to the recording surface 212 (CDEF).

The MA servo system corresponding to the recording surface 212 does not need to be divided into two systems. For example, the MA servo system corresponding to the recording surface 212 can be divided into three including an MA servo system corresponding to the recording surface 212 (AB), an MA servo system corresponding to the recording surface 212 (CD), and an MA servo system corresponding to the recording surface 212 (EF). In that case, the positions of three or two magnetic heads 227 can be finely moved in a mutually independent manner during the PMA operation.

The structure of the actuator is not limited to TSA. Even if the number of MAs independently operate on the arm 120 increases to form a multi-stage actuator including a four-stage actuator or more, it can be applied to the embodiments of the present invention. According to the embodiments of the present invention, operation of a plurality of MAs can be switched by the MA control circuit being switched without separately providing MA control circuits corresponding to respective operations of the multi-stage actuator or the respective MAs.

One of techniques to be applied to the HDD is a technique referred to as a multi-actuator or a split actuator in which multiple VCM actuators that are attached to a common support shaft and independently operate are provided. With the split actuator, recording heads corresponding to respective VCM actuators independently operate as separate units, whereby it becomes possible to perform reading/writing in parallel for each unit. In a case where the present embodiment is applied to the HDD including the split actuator, the respective units corresponding to the VCM actuators can simultaneously perform different operations. That is, at the same time when reading/writing (including SSW) based on the PMA operation is executed in a certain unit, reading/writing (including SSW) based on the TSA operation can be executed in another unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hard disk drive comprising:

a plurality of recording surfaces including a first recording surface and a second recording surface;

a first magnetic head that performs reading/writing on the first recording surface;

a second magnetic head that performs reading/writing on the second recording surface;

a first actuator and a second actuator that move the first head;

a third actuator and a fourth actuator that move the second head;

a fifth actuator that moves the second actuator and the fourth actuator in an integrated manner;

a drive circuit that switches a combination of actuators to be operated independently among the first to fourth actuators; and a controller that controls the drive circuit.

2. The hard disk drive according to claim 1, wherein the drive circuit includes a plurality of switches that switches a switching state to select, from the first actuator, the second actuator, the third actuator, and the fourth actuator, an actuator to which a drive signal is input.

3. The hard disk drive according to claim 2, further comprising:

at least one signal generation circuit that outputs a plurality of digital signals different from each other for controlling any of the first actuator, the second actuator, the third actuator, and the fourth actuator, wherein the drive circuit includes a plurality of converters that converts a digital signal output from the signal generation circuit into an analog signal, and a plurality of amplifiers that amplifies the analog signal output from each converter and outputs the analog signal to the selected actuator as a drive signal.

4. The hard disk drive according to claim 3, wherein at least one of the plurality of switches includes at least one end and another end, one end is electrically connected to one converter, and the other end is electrically connected to one amplifier, and the drive circuit switches a conduction state between one end and the other end of the switch under control of the controller.

5. The hard disk drive according to claim 4, wherein the plurality of digital signals different from each other is output from a plurality of different output terminals of the signal generation circuit, the plurality of output terminals is electrically connected to input of different converters, and the first actuator, the second actuator, the third actuator, and the fourth actuator are electrically connected to output of each amplifier.

6. The hard disk drive according to claim 3, wherein each switch has at least one end and another end, one end is electrically connected to each amplifier, and the other end is electrically connected to any of the first actuator, the second actuator, the third actuator, and the fourth actuator, and the drive circuit switches a conduction state of one end and the other end of the switch under control of the controller.

7. The hard disk drive according to claim 1, wherein the drive circuit is capable of selecting, with the controller, a mode in which the first actuator and the second actuator operate in a mutually independent manner.

8. The hard disk drive according to claim 7, wherein in the mode, the third actuator performs operation same as operation performed by the first actuator, and the fourth actuator performs operation same as operation performed by the second actuator.

9. The hard disk drive according to claim 7, further comprising:

a third recording surface, wherein the drive circuit switches to the mode in a case where, when the first magnetic head records servo information on the first recording surface, the controller determines that a distance between the third recording surface and the first recording surface is longer than a reference distance.

10. The hard disk drive according to claim 1, wherein the first magnetic head and the second magnetic head are capable of reading/writing data different from each other on the first recording surface and the second recording surface simultaneously.

11. The hard disk drive according to claim 1, wherein the fifth actuator is driven by a voice coil motor (VCM).

12. The hard disk drive according to claim 1, further comprising:

a fourth recording surface;

a third magnetic head that performs reading/writing on the fourth recording surface;

a sixth actuator that moves the third magnetic head; and a seventh actuator that is provided between the fifth actuator and the third magnetic head and moves the third magnetic head and the sixth actuator in an integrated manner, wherein the sixth actuator and the first actuator perform same operation, and the seventh actuator and the second actuator perform same operation.

13. The hard disk drive according to claim 12, wherein the same operation includes operation in which two actuators are displaced by a same amount in a same direction, and different operations include operation in which a displacement amount of one of two actuators is different from a displacement amount of the other actuator.

14. The hard disk drive according to claim 1, wherein the first actuator, the second actuator, the third actuator, and the fourth actuator include a piezoelectric element.

* * * * *